United States Patent
Maeda et al.

(10) Patent No.: US 10,026,318 B2
(45) Date of Patent: Jul. 17, 2018

(54) VEHICLE DRIVE CONTROL APPARATUS AND SPEED CONTROL METHOD

(71) Applicant: Hitachi, Ltd., Chiyoda-ku, Tokyo (JP)

(72) Inventors: Kenta Maeda, Tokyo (JP); Atsushi Yokoyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 89 days.

(21) Appl. No.: 15/215,843

(22) Filed: Jul. 21, 2016

(65) Prior Publication Data
US 2017/0039855 A1    Feb. 9, 2017

(30) Foreign Application Priority Data
Aug. 7, 2015   (JP) .................................. 2015-156980

(51) Int. Cl.
| | |
|---|---|
| G08G 1/16 | (2006.01) |
| B60K 31/00 | (2006.01) |
| B60W 30/09 | (2012.01) |
| B60W 30/095 | (2012.01) |
| B60W 30/14 | (2006.01) |

(52) U.S. Cl.
CPC ......... *G08G 1/166* (2013.01); *B60K 31/0008* (2013.01); *B60W 30/09* (2013.01); *B60W 30/0956* (2013.01); *B60W 30/143* (2013.01); B60K 2031/0025 (2013.01); B60K 2031/0091 (2013.01); B60W 2550/10 (2013.01); B60W 2720/10 (2013.01); B60W 2720/103 (2013.01)

(58) Field of Classification Search
None
See application file for complete search history.

(56) References Cited

U.S. PATENT DOCUMENTS

| | | |
|---|---|---|
| 2009/0043440 A1 | 2/2009 | Matsukawa et al. |
| 2011/0106391 A1 | 5/2011 | Shida |
| 2014/0142839 A1 | 5/2014 | Kaminade |
| 2015/0166062 A1 | 6/2015 | Johnson et al. |

FOREIGN PATENT DOCUMENTS

| | | |
|---|---|---|
| JP | 2009-175814 A | 8/2009 |
| JP | 2013-224094 A | 10/2013 |

OTHER PUBLICATIONS

Extended European Search Report issued in counterpart European Application No. 16179708.9 dated Mar. 31, 2017 (Eight (6) pages).

*Primary Examiner* — Mussa A Shaawat
*Assistant Examiner* — Abdhesh K Jha
(74) *Attorney, Agent, or Firm* — Crowell & Moring LLP

(57) ABSTRACT

A vehicle drive control apparatus includes: an object detection unit which detects positions, speeds, and sizes of objects around an own vehicle; and a speed control unit which detects a moving object existing in a place adjacent to a scheduled travelling path of the own vehicle and a speed change induction obstacle inducing a future speed vector change of the moving object from the objects detected by the object detection unit and changes a speed of the own vehicle, on the basis of a relative position relation of the own vehicle and the detected moving object and the speed change induction obstacle.

13 Claims, 24 Drawing Sheets

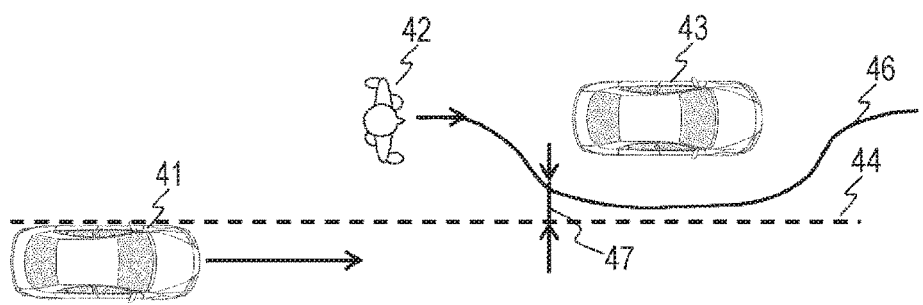
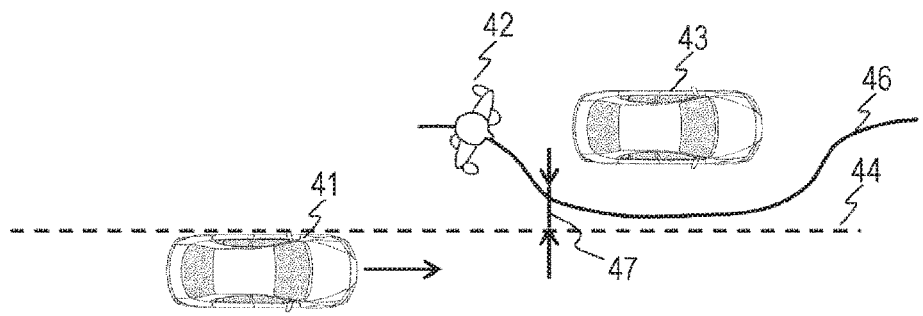
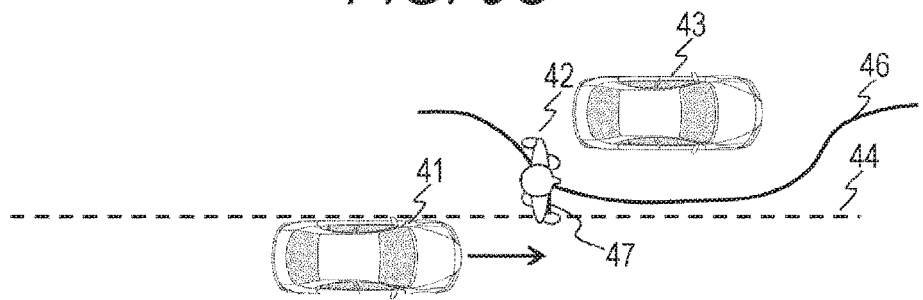

VEHICLE DRIVE CONTROL APPARATUS AND SPEED CONTROL METHOD

CLAIM OF PRIORITY

The present application claims priority from Japanese Patent applications serial No.2015-156980, filed on Aug. 7, 2015, the respective contents of which are hereby incorporated by reference into this application.

BACKGROUND OF THE INVENTION

1. Field of the Invention

The present invention relates to a vehicle drive control apparatus and a speed control method that avoid an own vehicle and a moving object from colliding with each other.

2. Description of the Related Art

Conventionally, a driving support device and a vehicle drive control apparatus to prevent a moving object such as a pedestrian and a bicycle from colliding with an own vehicle in advance at the time of a rapid route change of the moving object and secure safety and a sense of security of an occupant are known. For example, JP-2009-175814-A discloses that a change of a distance between two front and rear objects including a moving object on a sidewalk or a roadway adjacent to a travelling lane on which a vehicle is travelling is detected, a travelling direction of the moving object is predicted, and when it is determined that there is a risk that the own vehicle and the moving object collide with each other, the risk is provided to a driver through an information providing unit. In addition, JP-2013-224094-A discloses driving support in which, when two moving objects are detected in front of an own vehicle, a relative speed of the two moving objects and offset amounts of the two moving objects in a direction orthogonal to an own vehicle travelling direction are calculated, and control to avoid an own vehicle from colliding with the moving object predicted as moving to the own vehicle side is executed on the basis of positions, the relative speed, and the offset amounts of the two moving objects.

SUMMARY OF THE INVENTION

In a method disclosed in JP-2009-175814-A, the change of the distance between the objects on the sidewalk or the roadway adjacent to the travelling lane on which the vehicle is travelling is detected and when the distance between the objects becomes a predetermined value, it is predicted that the object moving at a high speed changes a route to the travelling lane side of the own vehicle. In addition, in JP-2013-224094-A, positions where the objects start to change the route to the travelling lane side of the own vehicle are predicted on the basis of the relative speed of the objects and the offset amounts of the objects in the direction orthogonal to the own vehicle travelling direction, so that it is possible to correspond to the case where the object moving at a low speed changes the route.

However, in both JP-2009-175814-A and JP-2013-224094-A, future collision is predicted on the basis of the distance of the object and the own vehicle in only the travelling direction with respect to a position relation of the object and the own vehicle and a position relation of the object and the own vehicle in an orthogonal direction is not considered. In the case where a device disclosed in each of JP-2009-175814-A and JP-2013-224094-A is applied to an automatic speed control device for automatic driving, even when the object and the own vehicle are separated such that there is little risk that the object and the own vehicle collide with each other due to the route change of the object, the vehicle may decelerate to impair quick transportability for the occupant and frequent acceleration and deceleration may spoil riding comfort for the occupant.

An object of the present invention is to a vehicle drive control apparatus and a speed control method that perform a future collision prediction of an own vehicle and an object appropriately and raise convenience and a sense of security for an occupant.

In order to solve the above issue, a vehicle drive control apparatus according to the present invention includes: an object detection unit which detects positions, speeds, and sizes of objects around an own vehicle; and a speed control unit which detects a moving object existing in a place adjacent to a scheduled travelling path of the own vehicle and a speed change induction obstacle inducing a future speed vector change of the moving object from the objects detected by the object detection unit and changes a speed of the own vehicle, on the basis of a relative position relation of the own vehicle and the detected moving object and the speed change induction obstacle.

The present invention can provide a vehicle drive control apparatus that performs a future collision prediction of an own vehicle and an object appropriately and raise convenience and a sense of security for an occupant.

BRIEF DESCRIPTION OF THE DRAWINGS

FIGS. 9A to 9C are diagrams illustrating an example of a temporal change of a position relation of objects (second embodiment);

DESCRIPTION OF THE PREFERRED EMBODIMENTS

Preferred embodiments of the present invention will be described in detail below with reference to the accompanying drawings.

First Embodiment

First, a first embodiment to be an example of the present invention will he described using FIGS. 1 to 5.

Figure 1:
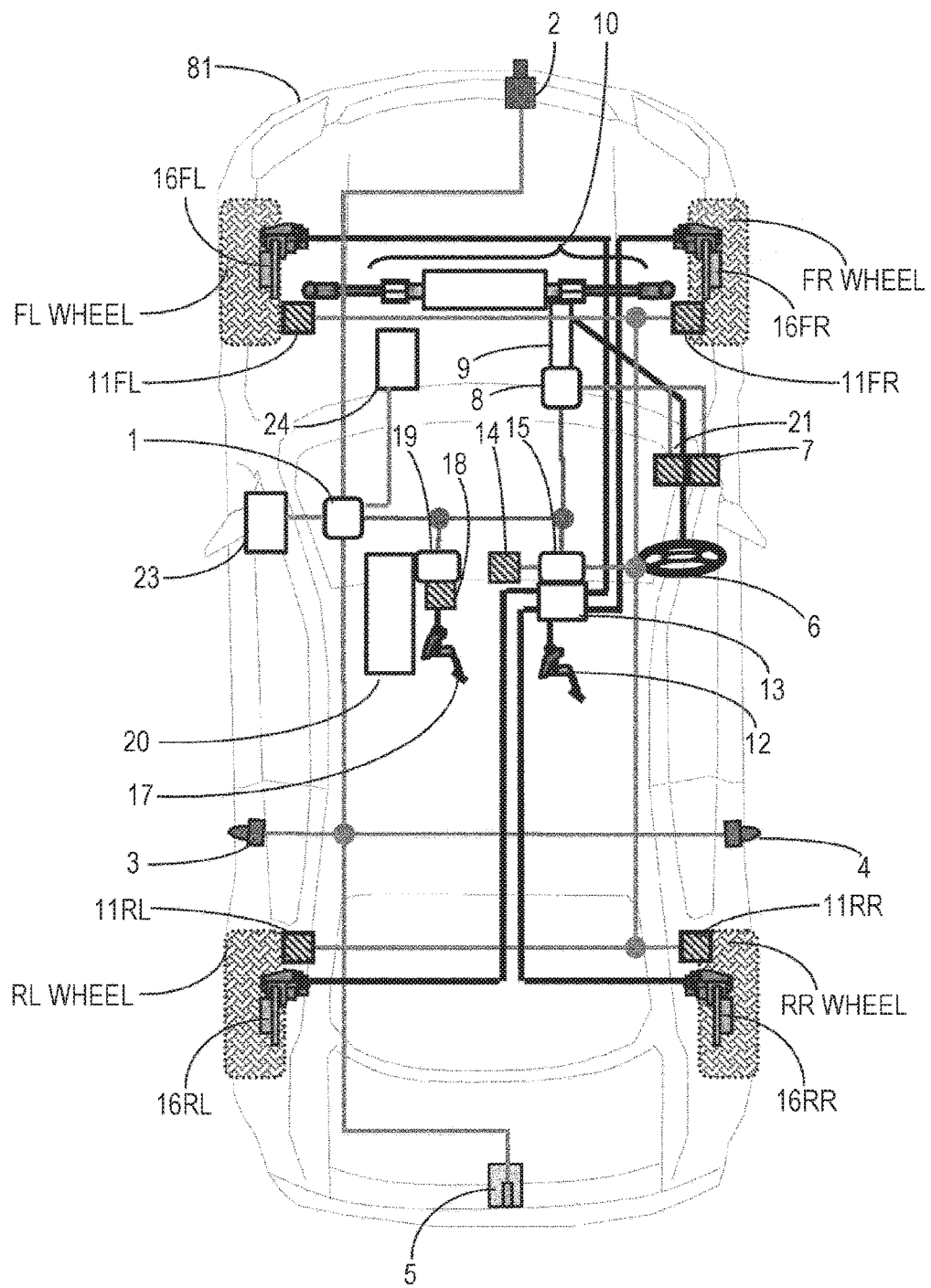
FIG. 1 is a diagram illustrating an entire configuration of a vehicle on which a vehicle drive control apparatus 1 is mounted.

FIG. 1 is a diagram illustrating an entire configuration of a vehicle 41 on which a vehicle drive control apparatus 1 according to the first embodiment is mounted. An FL wheel, an FR wheel, an RL wheel, and an RR wheel mean a front left wheel, a front rear wheel, a rear left wheel, and a rear right wheel, respectively.

The vehicle 41 includes a vehicle drive control apparatus 1 that operates command values for a steering control mechanism 10 to control a travelling direction of the vehicle, a brake control mechanism 13, and a throttle control mechanism 20, on the basis of information of sensors 2, 3, 4, and 5 to recognize an external world. In addition, the vehicle 41 includes a steering control device 8 that controls the steering control mechanism. 10, on the basis of the command value from the vehicle drive control apparatus 1, a braking control device 15 that controls the brake control mechanism. 13, on the basis of the command value, and adjusts distribution of brake force of each wheel, an acceleration control device 19 that controls the throttle control mechanism 20, on the basis of the command value, and adjusts a torque output of an engine, and a display device 24 that displays a travelling plan of the own vehicle 41 and a behavior prediction of a moving object existing around the own vehicle 41.

As the sensors to recognize the external world, a camera 2 is provided on a front side, laser radars 3 and 4 are provided on left and right sides, and a millimeter-wave radar 5 is provided on a rear side, so that a relative distance and a relative speed of the own vehicle and a surrounding vehicle can be detected. In addition, the vehicle 41 includes a communication device 23 that performs communication between a road and a vehicle and between vehicles. In this embodiment, a combination of the sensors is described as an example of a sensor configuration. However, the present invention is not limited thereto and a combination of an ultrasonic sensor, a stereo camera, and an infrared camera may be used. The sensor signal is input to the vehicle drive control apparatus 1.

Figure 2:
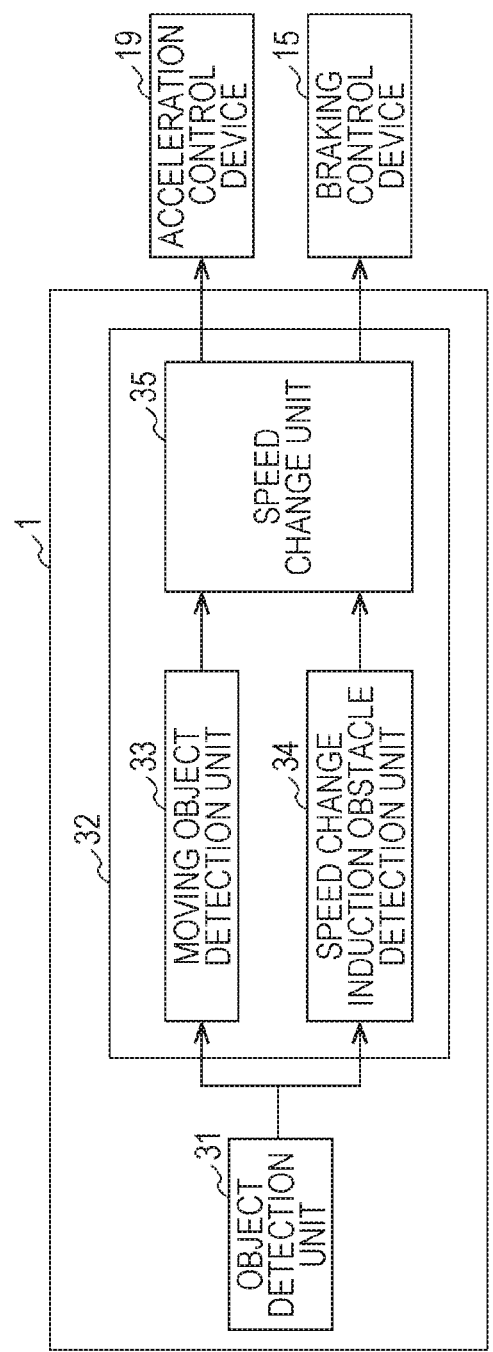
FIG. 2 is a block diagram illustrating a configuration of a first embodiment of the vehicle drive control apparatus 1.

Although not illustrated in detail in FIG. 1, the vehicle drive control apparatus 1 has a CPU, a ROM, a RAM, and an input/output device. A flow of vehicle travelling control described using FIGS. 2 and 3 is stored in the ROM. Although described in detail below, the vehicle drive control apparatus 1 operates command values of individual actuators 10, 13, and 20 to control vehicle travelling according to the generated travelling plan. The control devices 8, 15, and 19 of the individual actuators 10, 13, and 20 receive the command values of the vehicle drive control apparatus 1 by the communication and control the individual actuators, on the basis of the command values.

Next, an operation of a brake will be described. In a state in which a driver drives the vehicle, stepping force when the driver steps on the brake pedal 12 is boosted by a brake booster (not illustrated in the drawings) and a hydraulic pressure according to the force is generated by a master cylinder (not illustrated in the drawings). The generated hydraulic pressure is supplied to a wheel cylinder 16 via the brake control mechanism 13. Each of wheel cylinders 16FL to 16RR includes a cylinder (not illustrated in the drawings), a piston, and a pad and in each of the wheel cylinders, the piston is propelled by an operating fluid supplied from the master cylinder 9 and the pad connected to the piston is pressed to a disk rotor. The disk rotor rotates with the wheels (not illustrated in the drawings). For this reason, the brake torque acting on the disk rotor becomes brake force acting on a portion between the wheels and a road surface. In this way, braking force can be generated in each wheel, according to a brake pedal operation of the driver.

Although not illustrated in detail in FIG. 1, the braking control device 15 has a CPU, a ROM, a RAM, and an input/output device, similar to the vehicle drive control apparatus 1. Sensor signals from a combined sensor 14 capable of detecting longitudinal acceleration, horizontal acceleration, and a yaw rate and wheel speed sensors 11FL to 11RR disposed on the individual wheels and a brake force command from the braking control device 15 are input to the braking control device 15 and a sensor signal from a steering wheel angle detection device 21 via the steering control device 8 to be described below is input to the braking control device 15.

In addition, an output of the braking control device 15 is connected to the brake control mechanism 13 having a pump (not illustrated in the drawings) and a control valve and any braking force can be generated in each wheel, independently from the brake pedal operation of the driver. The braking control device 15 executes a function of estimating the spin and the drift-out of the vehicle and the lock of the wheel, on the basis of the information, generates the braking force of the wheel to control these, and raising steering stability of the driver.

In addition, the vehicle drive control apparatus 1 communicates the brake command to the braking control device, so that the vehicle drive control apparatus 1 can generate any brake force in the vehicle, and executes a function of automatically performing braking in automatic driving in which the operation of the driver is not generated. However, the present invention is not limited to the braking control device and other actuator such as a brake-by-wire may be used.

Next, an operation of steering will be described. In a state in which the driver drives the vehicle, the steering torque and the steering wheel angle input from the driver using the steering wheel 6 are detected by a steering torque detection device 7 and the steering wheel angle detection device 21, respectively, and the steering control device 8 controls a motor, on the basis of these information, and generates assist torque. Although not illustrated in detail in FIG. 1, the steering control device 8 also has a CPU, a ROM, a RAM, and an input/output device, similar to the vehicle drive control apparatus 1. The steering control mechanism 10 is moved by total force of the steering torque of the driver and the assist torque by the motor and the front wheel is steered. Meanwhile, reaction force from the road surface is transmitted to the steering control mechanism according to a steering angle of the front wheel and is transmitted as road surface reaction force to the driver.

The steering control device 8 can control the steering control mechanism 10 by generating the torque by the motor 9, independently from the steering operation of the driver. Therefore, the vehicle drive control apparatus 1 communicates a steering force command to the steering control device 8, so that the vehicle drive control apparatus 1 can control the front wheel at any steering angle, and executes a function of automatically performing steering in automatic driving in which the operation of the driver is not generated. However, the present invention is not limited to the steering control device and other actuator such as a steer-by-wire may be used.

Next, an accelerator will be described. A stepping in amount of an accelerator pedal 17 of the driver is detected by a stroke sensor 18 and is input to an acceleration control device 19. Although not illustrated in detail in FIG. 1, the acceleration control device 19 also has a CPU, a ROM, a RAM, and an input/output device, similar to the vehicle drive control apparatus 1. The acceleration control device 19 adjusts a throttle opening according to the stepping-in amount of the accelerator pedal and controls the engine.

In this way, the vehicle can be accelerated according to the accelerator pedal operation of the driver. In addition, the acceleration control device 19 can control the throttle opening, independently from the accelerator operation of the driver. Therefore, the vehicle drive control apparatus 1 communicates an acceleration command to the acceleration control device 19, so that the vehicle drive control apparatus 1 can generate any acceleration in the vehicle, and executes a function of automatically performing acceleration in automatic driving in which the operation of the driver is not generated.

FIG. 2 is a block diagram illustrating a part of a configuration of the first embodiment of the present invention. In the embodiment of FIG. 2, the vehicle drive control apparatus 1 includes at least an object detection unit 31 and a speed control unit 32.

The object detection unit 31 acquires position information and sizes of objects around the own vehicle 41, from peripheral external word information acquired by the sensors 2 to 5 mounted on the own vehicle 41, and acquires a position and speed information of a moving object from the peripheral external world information, when an obstacle is the moving object. When image data of the camera 2 is used, kinds of a plurality of objects can be identified at the same time and information can be acquired. Particularly, in a stereo camera using two cameras, because a relative distance and a relative speed of the moving object or the obstacle and the own vehicle can be detected, the stereo camera is advantageous.

The speed control unit 32 changes a speed of the own vehicle 41, when a moving object and a speed change induction obstacles are detected from the objects detected by the object detection unit 31. The speed control unit 32 includes at least a moving object detection unit 33, a speed change induction obstacle detection unit 34, and a speed change unit 35.

The moving object detection unit 33 detects an object, which exists in a place adjacent to a scheduled travelling path of the own vehicle 41 and advances in a direction where an angle with a travelling direction of the own vehicle 41 is a predetermined value or less and of which a distance with the own vehicle is a predetermined value or less among the objects detected by the object detection unit 31, as a moving object 42. The predetermined value of the angle is set to 45°, for example, so that control limited to a moving object, which may contact the own vehicle due a future speed vector change, is enabled. In addition, the predetermined value of the distance is set to 30 m, for example, so that the own vehicle 41 can limit candidates of moving objects to be avoided to surrounding moving objects of the own vehicle, and a calculation load can be reduced. The predetermined value of the distance is not necessarily a constant number, may be determined according to the distance, and may be set in a range of values that can be detected by the sensors.

For the scheduled travelling path, a region which the own vehicle 41 passes through in the future when a current steering angle of the own vehicle 41 is maintained is as the scheduled travelling path. Alternatively, an own vehicle scheduled travelling generation unit to generate the scheduled travelling path from information of a region where the own vehicle 41 can travel or a destination may be provided separately and the scheduled travelling path may be acquired. As the moving object 42, a pedestrian or a bicycle moving to the front left side of the own vehicle 41 is detected.

The speed change induction obstacle detection unit 34 detects, as the speed change induction obstacle 43, an object, in which a minimum distance for a straight line extended in a travelling direction of the moving object 42 is a predetermined value or less and which moves or stops in a direction where a relative distance with the moving object 42 is reduced, among the objects detected by the object detection unit 31. The predetermined value of the minimum distance is set to 0.5 m, for example. In this case, when the moving object 42 goes straight in a state in which the moving object 42 maintains a current speed vector, the moving object 42 comes close to the speed change induction obstacle 43 to a distance of 0.5 m or less with the speed change induction obstacle 43. When the speed change induction obstacle 43 exists to block a course of the moving object 42, the minimum distance is regarded as 0 m.

Figure 3A:
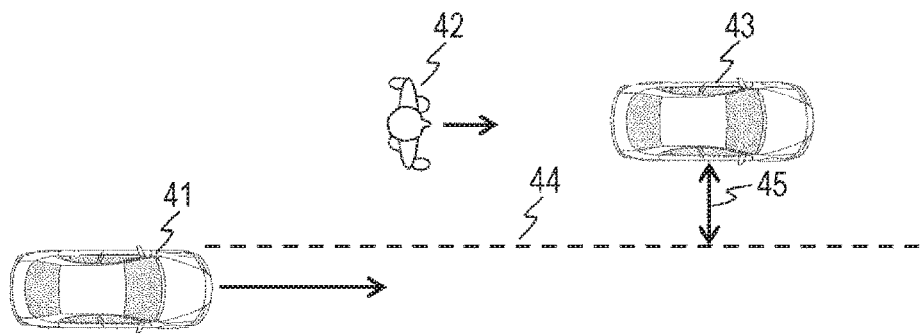
FIGS. 3A to 3C are diagrams illustrating examples of a moving object 42 and a speed change induction obstacle 43.
Figure 3B:
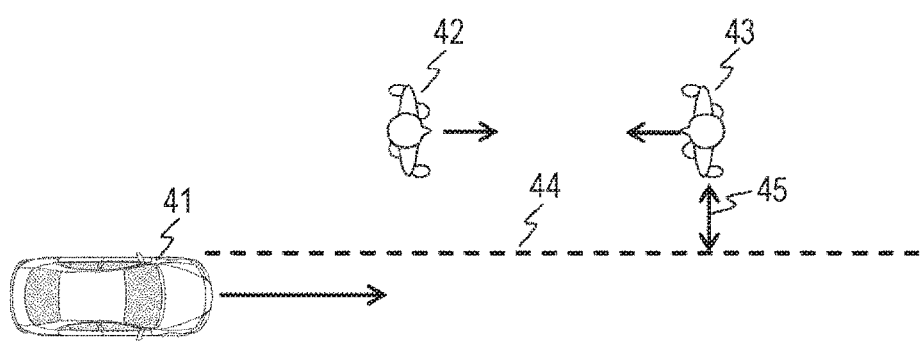
Figure 3C:
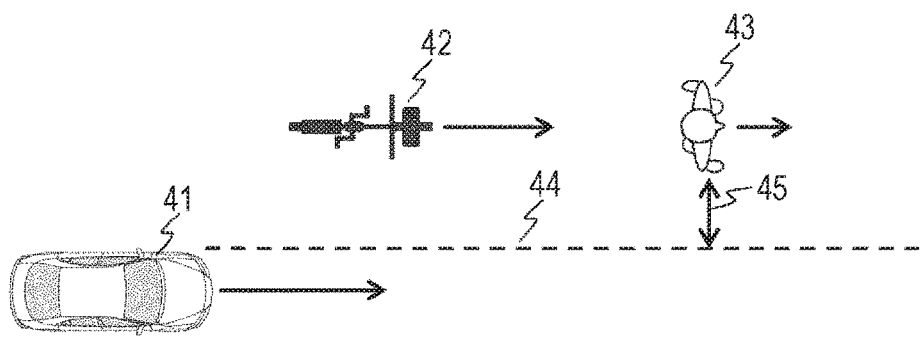

FIGS. 3A to 3C illustrate examples of the moving object 42 and the obstacle 43. FIG. 3A illustrates an example of the case where the moving object 42 is a pedestrian and the speed change induction obstacle 43 is a parked vehicle. In this case, because the parked vehicle stops and the moving object 42 moves to the parked vehicle, the relative distance is reduced. FIG. 3B illustrates an example of the case where the moving object 42 is a pedestrian and the speed change induction obstacle 43 is a pedestrian who moves in an opposite direction of a travelling direction of the own vehicle. In this case, because the speed change induction obstacle 43 moves to the moving object 42, the relative distance is reduced. FIG. 3C illustrates an example of the case where the moving object 42 is a bicycle and the speed change induction obstacle 43 is a pedestrian who moves in the same direction as the travelling direction of the own vehicle. In this case, the speed of the pedestrian is lower than the speed of the moving object 42 and the relative distance is reduced.

As illustrated in FIGS. 3A to 3C, the speed change unit 35 performs a speed change on the basis of a minimum distance 45 of a scheduled travelling path 44 of the own vehicle and the speed change induction obstacle 43. Specifically, when the minimum distance 45 is small, the speed change unit 35 performs the speed change to decrease the speed of the own vehicle 41 and when the minimum distance 45 is large, the speed change unit 35 reduces an amount of the speed change, that is, rarely performs deceleration.

As a result, when the minimum distance 45 is small, it is previously determined that a speed vector of the moving object 42 changes to the side of the own vehicle 41 and a risk of a contact with the own vehicle is high and the speed of the own vehicle 41 can be previously decreased. In addition, when the minimum distance 45 is large, a sufficient distance is secured between the own vehicle 41 and the moving object 42 even if the speed vector of the moving object 42 changes. Therefore, it is determined that the risk of the contact with the own vehicle is low and unnecessary deceleration is prevented.

A speed plan until the own vehicle 41 passes by the speed change induction obstacle 43 from a current time of the own vehicle 41 is generated on the basis of a plan of the speed change generated as described above. In addition, an acceleration/deceleration command value is generated on the basis of an own vehicle position and an operation state amount, such that the vehicle behavior follows the speed plan, and the command value is transmitted to the acceleration control device 19 and the braking control device 15 by communication.

Figure 4:
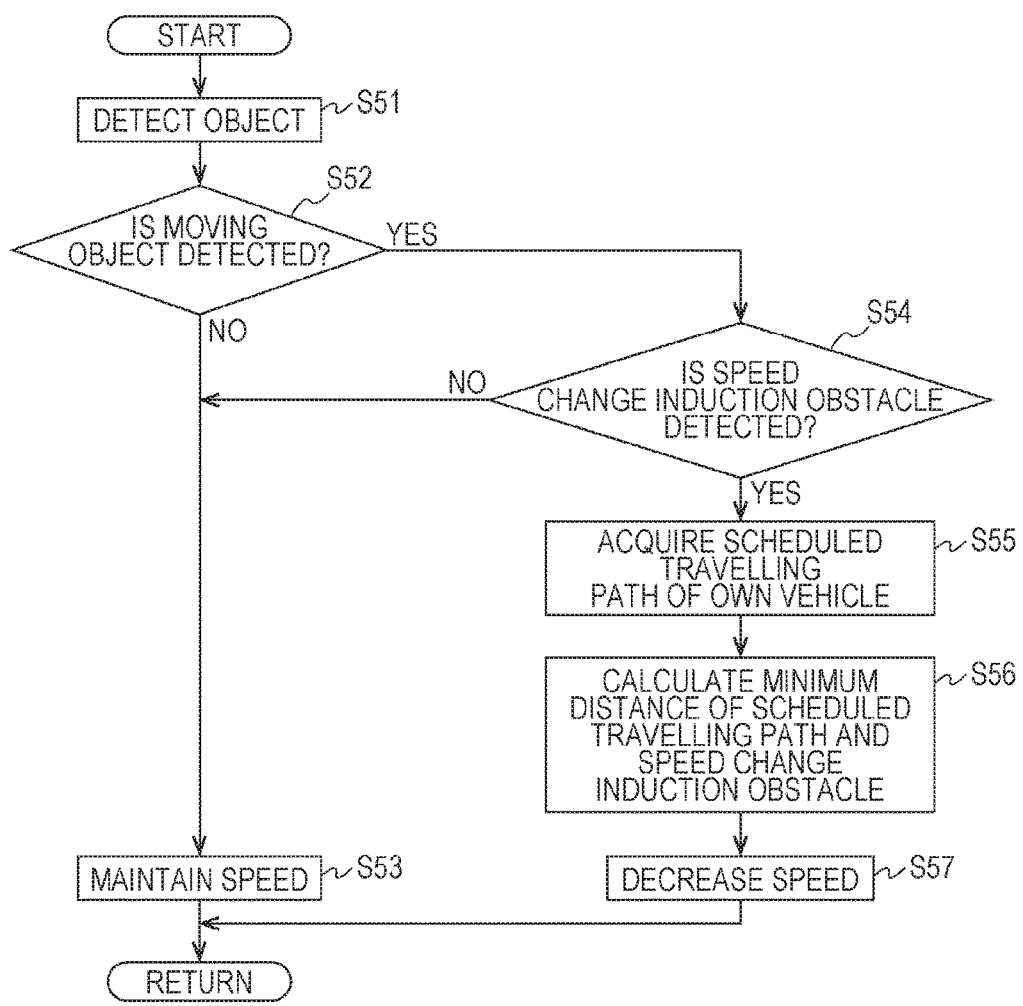
FIG. 4 is a diagram illustrating a system flow (first embodiment)

FIG. 4 is a flow diagram illustrating a system flow according to the first embodiment of the present invention. In the flow, it is determined in each calculation step whether it is necessary to perform the speed change and when the speed change is necessary, the speed change is performed by a predetermined unit.

First, the objects existing around the own vehicle 41 are detected (S51) and it is determined whether the moving object 42 exists (S52). When the moving object 42 is detected (S52: YES), the process proceeds to step S54 and when the moving object 42 is not detected (S52: NO), the current speed of the own vehicle 41 is maintained without the speed change (S53).

Next, when the moving object 42 is detected, it is determined whether the speed change induction obstacle 43 exists (S54). When the speed change induction obstacle 43 is detected (S54: YES), the process proceeds to step S55 and when the speed change induction obstacle 43 is not detected (S54: NO), the current speed of the own vehicle 41 is maintained without the speed change (S53).

In the case of S54: YES, the process proceeds to step S55 and the scheduled travelling path of the own vehicle is acquired. In addition, the minimum distance of the scheduled travelling path and the speed change induction obstacle 43 is calculated (S56). Net, the speed change is performed such that the speed of the own vehicle 41 decreases, according to the minimum distance (S57).

Figure 5A:
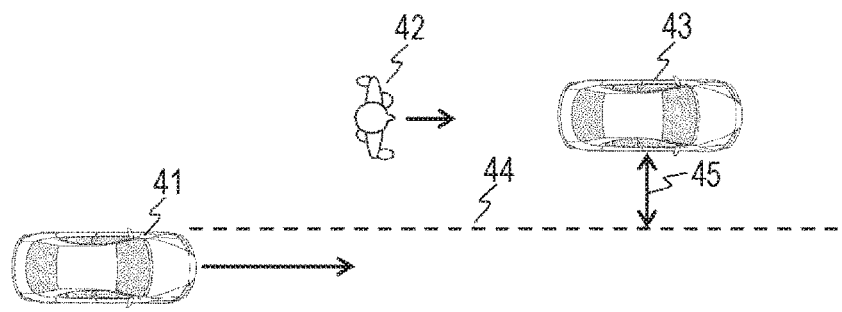
FIGS. 5A to 5C are diagrams illustrating a vehicle behavior (first embodiment)
Figure 5B:
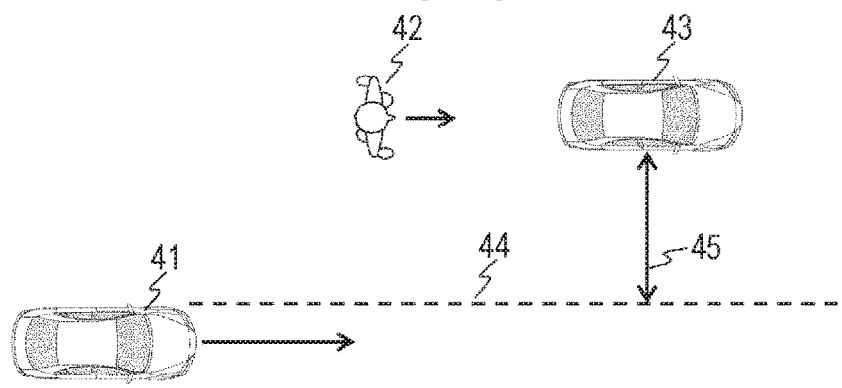
Figure 5C:
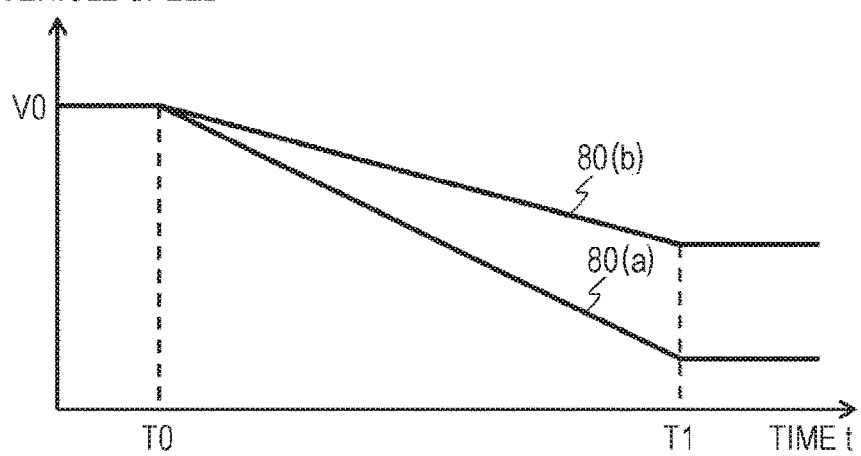

Functions of the first embodiment of the present invention will be described using FIGS. 5A to 5C. Here, the case where the moving object 42 is a pedestrian who moves in the same direction as a travelling direction of the own vehicle and the speed change induction obstacle 43 is a parked vehicle is described. However, a combination of the moving object 42 and the speed change induction obstacle 43 may be other example illustrated in FIG. 3. FIG. 5A illustrates the case where the minimum distance 45 of the scheduled travelling path 44 of the own vehicle 41 and the speed change induction obstacle 43 is small. FIG. 5B illustrates the case where the minimum distance 45 is large. FIG. 5C illustrates a speed plan 80 of the own vehicle 41 until a time (T1) when the own vehicle 41 passes by a lateral surface of the speed change induction obstacle 43 from a current time (T0). Here, an example of the small minimum distance 45 and an example of the large minimum distance 45 are displayed together.

The speed plan is set such that the speed of the own vehicle 41 is V0 at the current time (T0) and the speed of the own vehicle 41 is minimized at the time (T1). As illustrated in FIG. 5C, when the minimum distance 45 is small, the speed plan 80 is set low. A deceleration start time is set as T0 in both cases. However, when the minimum distance is large, the deceleration start time may be delayed.

The above is the functions of the first embodiment. According to the first embodiment of the present invention, the behavior change in which the moving object 42 changes the speed vector to the side of the own vehicle 41 to avoid the speed change induction obstacle 43 can be predicted and the speed plan can be set to decrease the speed of the own vehicle 41. As a result, rapid braking for collision avoidance with respect to the behavior change of the moving object 42 can be prevented and a sense of security or a riding comfort for an occupant can be raised.

In addition, when a distance of the own vehicle 41 and the speed change induction obstacle 43 is sufficiently large and the sufficient distance is secured even if the moving object 42 changes the behavior, that is, it is predicted that the risk of collision is low, convenience for the occupant such as quick transportability can be secured by preventing unnecessary deceleration.

Second Embodiment

Next, a second embodiment to be an example of the present invention will be described using FIGS. 6 to 20C. Descriptions for the parts similar to the first embodiment described above are omitted.

In the first embodiment, a speed change is performed on the basis of a minimum distance of an own vehicle 41 and a speed change induction obstacle 43. However, in actuality, there is the possibility that the own vehicle 41 passes by the speed change induction obstacle 43 before a movement vector of the moving object 42 changes, even when both the moving object 42 and the speed change induction obstacle 43 are detected. In this case, making a speed plan where the own vehicle 41 decelerates whenever both the moving object 42 and the speed change induction obstacle 43 are detected may impair quick transportability for an occupant. Therefore, it may be determined whether there is the possibility that the own vehicle 41 and the moving object 42 contact each other in the future by predicting a future position of the moving object 42 specifically and it may be determined whether a speed change is necessary.

Figure 6:
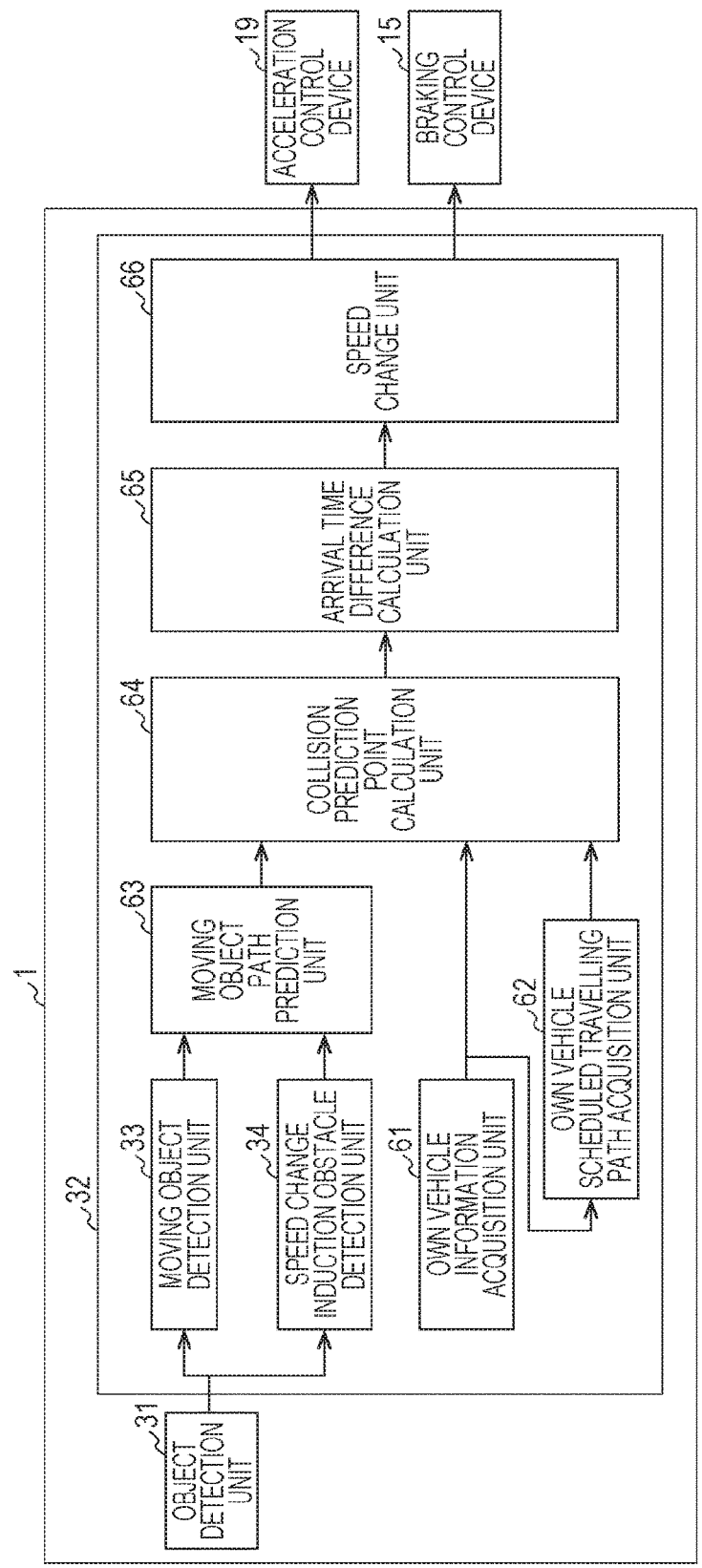
FIG. 6 is a block diagram illustrating a configuration of a second embodiment of the vehicle drive control apparatus 1.

FIG. 6 is a block diagram illustrating a part of a configuration of the second embodiment of the present invention. In the second embodiment illustrated in FIG. 6, a speed control unit 32 includes a moving object detection unit 33 and a speed change induction obstacle detection unit 34, similar to the first embodiment. The speed control unit 32 further includes an own vehicle information acquisition unit 61, an own vehicle scheduled travelling path acquisition unit 62, a moving object path prediction unit 63, a collision prediction point calculation unit 64, an arrival time difference calculation unit 65, and a speed change unit 66.

The own vehicle information acquisition unit 61 specifies a current position of the own vehicle 41 and calculates an operation state amount. A current position specification process specifies a position of the own vehicle 41 from external word information acquired by a GPS (not illustrated in the drawings) and at least one of the sensors 2 to 5. In addition to the acquisition of the current position by the GPS, image data of the vicinity of the own vehicle 41 may be acquired by the camera 2, the image data and an external world image and position information to be stored may be collated, and the position of the own vehicle 41 may be specified.

Alternatively, a method of recognizing a specific landmark by an image and specifying the position of the own vehicle 41 from the landmark, relative position information of the own vehicle 41, and absolute position information of the landmark is known. As specific examples of the operation state amount acquired in an operation state amount acquisition process, a speed, longitudinal acceleration, horizontal acceleration, a yaw rate, and a yaw angle acquired from a combined sensor 14 and a steering angle acquired from a steering wheel angle detection device 21 are known.

The own vehicle scheduled travelling path acquisition unit 62 acquires a region which the own vehicle 41 passes through in the future when a current steering angle of the own vehicle 41 is maintained as the scheduled travelling path. Alternatively, an own vehicle scheduled travelling generation unit to generate the scheduled travelling path from information of a region where the own vehicle 41 can travel or a destination may be provided separately and the scheduled travelling path may be acquired.

A specific own vehicle scheduled travelling generation method acquires destination information and route information of an occupant from a navigation system (not illustrated in the drawings) mounted on the vehicle, determines a travelling lane from information regarding a travelling scheduled road, and generates a track on the travelling lane. At this time, when there is an obstacle on the track, the track is modified frequently to avoid the obstacle.

In a place such as an intersection where there is no lane, a smooth track linking travelling lanes is generated. The own vehicle scheduled travelling generation method is no limited to the above method and a target travelling track associated with map information may be previously acquired.

The moving object path prediction unit 63 predicts a movement path from a current position of the moving object 42 to a position of the moving object 42 after a predetermined time passes, from a relative position relation of the moving object 42 and the speed change induction obstacle 43. Specifically, the moving object path prediction unit 63 calculates a track along which the moving object 42 travels with a constant distance from the speed change induction obstacle 43 to avoid the speed change induction obstacle 43 as a prediction movement path. The moving object path prediction unit 63 sets a predetermined value to 5 seconds and calculates a prediction movement path until 5 seconds pass from a current time. At this time, the prediction movement path may be calculated as time-series position information for every predetermined time interval (for example, one second) and a function for a time or a position may be realized.

Figure 7:
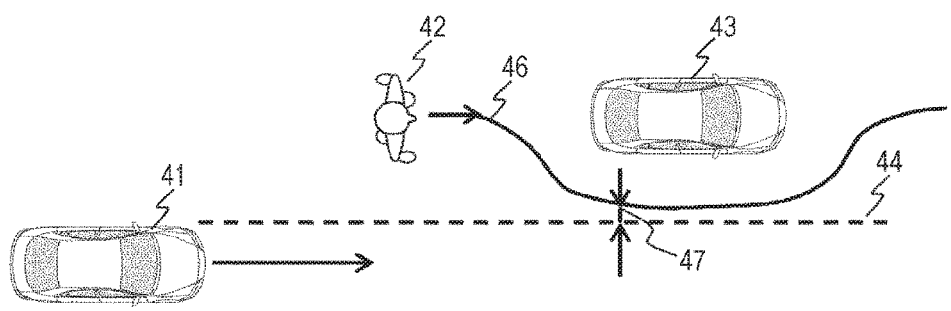
FIG. 7 is a diagram illustrating an example of a prediction movement path 46 (second embodiment)

FIG. 7 illustrates an example of a prediction movement path 46 of the moving object 42. In FIG. 7, the case where the own vehicle 41, the moving object 42, and the speed change induction obstacle 43 exist in a position relation illustrated in FIG. 7 at the current time is illustrated. Here, the case where the moving object 42 is a pedestrian who moves in the same direction as a travelling direction of the own vehicle 41 and the speed change induction obstacle 43 is parked vehicle is described. However, a combination of the moving object 42 and the speed change induction obstacle 43 may be other example illustrated in FIG. 3.

Because the speed change induction obstacle 43 exists on a straight line extended in a travelling direction of the moving object 42, the moving object path prediction unit 63 assumes that the moving object 42 moves to avoid the speed change induction obstacle 43 and generates the prediction movement path 46 as described in FIG. 7. Here, the prediction movement path. 46 is generated to draw a smooth track. However, when the prediction movement path 46 is generated as time-series position information for every predetermined time interval (for example, one second), the prediction movement path 46 can be illustrated as a point sequence of the time-series position information.

When there is a region where the distance of a scheduled travelling path 44 of the own vehicle and the prediction movement path 46 becomes a predetermined value or less, the collision prediction point calculation unit 64 defines a point closest to the own vehicle 41 as a collision prediction point 47 and calculates a position thereof, if the distance is set as the predetermined value to 1 m, a place where the distance of the own vehicle 41 and the moving object 42 approaches 1 m is set as the collision prediction point 47.

The predetermined value may be determined according to an error of object position acquisition information by a sensor and may be determined on the basis of magnitude of clearance needed when an occupant passes through the vicinity of the moving object. For example, in the case where the occupant feels a sense of uneasiness if an interval of 1.5 m or more is not taken when the occupant passes through the vicinity of the moving object, the predetermined value is set to 1.5 m.

When it is assumed that each of the own vehicle 41 and the moving object 42 maintains a current speed, the arrival time difference calculation unit 65 calculates a time TTCP needed when each of the own vehicle 41 and the moving object 42 arrives at the collision prediction point 47 and calculates a difference ΔTTCP thereof. Specifically, if a travelling direction of the own vehicle 41 is represented as the X coordinates, the X coordinates of the current position of the own vehicle 41 is represented as X1, a speed is represented as V1, the X coordinates of the current position of the moving object 42 is represented as X2, a speed is represented as V2, and the X coordinates of the collision prediction point 47 is set as X3, ΔTTCP is acquired as represented by a formula 1.

$$\Delta TTCP = (X3-X2)/V2 - (X3-X1)/V1 \qquad \text{[Formula 1]}$$

In addition, a speed plan of the own vehicle 41 until a predetermined time passes is acquired and the arrival time difference may be calculated on the basis of the speed plan.

The speed change unit 66 changes a speed of the own vehicle, on the basis of ΔTTCP obtained by the arrival time difference calculation unit 65. When ΔTTCP approaches 0, this means that the own vehicle 41 and the moving object 42 pass through the collision prediction point at almost the same time, that is, there is the possibility that the own vehicle 41 and the moving object 42 contact each other. Therefore, when it is anticipated that an absolute value of ΔTTCP is less than a predetermined value, the speed change unit 66 decelerates the own vehicle 41, such that ΔTTCP is matched with the predetermined value. For example, when the predetermined value is set to 2 seconds, the speed change unit 66 determines that the contact possibility is low under any one of a condition where the moving object 42 arrives at the collision prediction point 47 earlier by 2 seconds or more than the own vehicle 41 and a condition where the own vehicle 41 arrives at the collision prediction point 47 earlier by 2 seconds or more than the moving object 42 and does not change the speed.

Meanwhile, the condition is not satisfied, a target arrival time in the collision prediction point 47 is set such that the own vehicle 41 passes through the collision prediction point 47 after 2 seconds pass from when the moving object 42 passes through the collision prediction point 47. In addition, a speed plan is made such that the own vehicle decelerate from the current speed from the current time to the target arrival time, an acceleration/deceleration command value is generated on the basis of the own vehicle position and the operation state amount, such that the vehicle behavior follows the speed plan, and the command value is transmitted to an acceleration control device 19 and a braking control device 15 by communication. The predetermined value is not limited to 2 seconds and may be set according to the preference of the occupant. Specifically, the predetermined value can be set to 1 second by putting emphasis on the quick transportability to the destination and the predetermined value can be set to 3 seconds by giving priority to safety or a sense of security.

Figure 8:
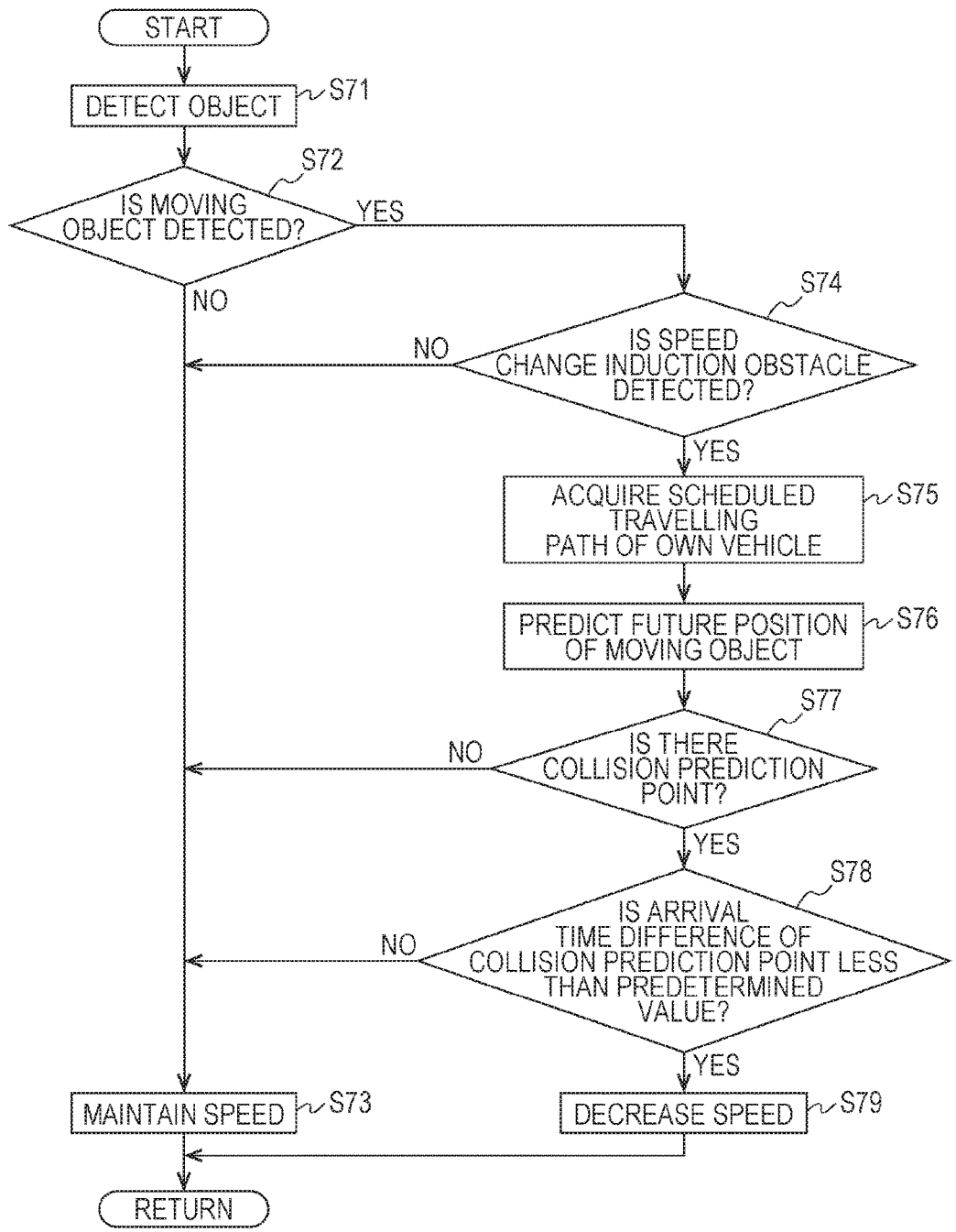
FIG. 8 is a diagram illustrating a system flow (second embodiment)

FIG. 8 is a flow diagram illustrating a system flow according to the second embodiment of the present invention. In the flow, it is determined in each calculation step whether it is necessary to perform the speed change and when the speed change is necessary, the speed change is performed by a predetermined unit.

First, the objects existing around the own vehicle 41 are detected (S71) and it is determined whether the moving object 42 exists (S72). When the moving object 42 is detected (S72: YES), the process proceeds to step S74 and when the moving object 42 is not detected (S72: NO), the current speed of the own vehicle 41 is maintained without the speed change (S73).

Next, when the moving object 42 is detected, it is determined whether the speed change induction obstacle 43 exists (S74). When the speed change induction obstacle 43 is detected (S74: YES), the process proceeds to step S75 and when the speed change induction obstacle 43 is not detected (S74: NO), the current speed of the own vehicle 41 is maintained without the speed change (S73).

In the case of S74: YES, the process proceeds to step S75 and the scheduled travelling path 44 of the own vehicle is acquired. In addition, the prediction movement path 46 of the moving object 42 is generated and the future position of the moving object 42 is predicted (S76). Next, a distance at individual points of the scheduled travelling path 44 of the own vehicle and the prediction movement path 46 is calculated and it is determined whether there are points where the distance becomes a predetermined value or less (S77). When there are the points (S77: YES), the process proceeds to step S78 and when there is no point (S77: NO), the current speed of the own vehicle 41 is maintained without the speed change (S73).

In the case of S77: YES, the process proceeds to step S78 and the collision prediction point 47 to be a point closest to the own vehicle 41 among the points where the distance of the scheduled travelling path 44 and the prediction movement path 46 becomes the predetermined value or less is acquired. In addition, the arrival time difference ΔTTCP of the own vehicle 41 and the moving object 42 is calculated at the point and it is determined whether ΔTTCP is less than the predetermined value. When ΔTTCP is less than the predetermined value (S78: YES), the speed change is performed such that the speed of the own vehicle 41 decreases (S79). Meanwhile, when ΔTTCP is the predetermined value or more (S77: NO), the current speed of the own vehicle 41 is maintained without the speed change (S73).

Functions of the second embodiment of the present invention will be described using FIGS. 9A to 11O. FIGS. 9A to 9C illustrate examples of a position relation of the own vehicle 41, the moving object 42, and the speed change induction obstacle 43 according to a time passage. FIG. 9A illustrates a current time (time T0), FIG. 9B illustrates a time (time T1) when the moving object 42 induces a speed vector change, and FIG. 9C illustrates a time (time T2) when the distance of the moving object 42 and the scheduled travelling path 44 of the own vehicle 41 is the predetermined value or less.

Figure 10:
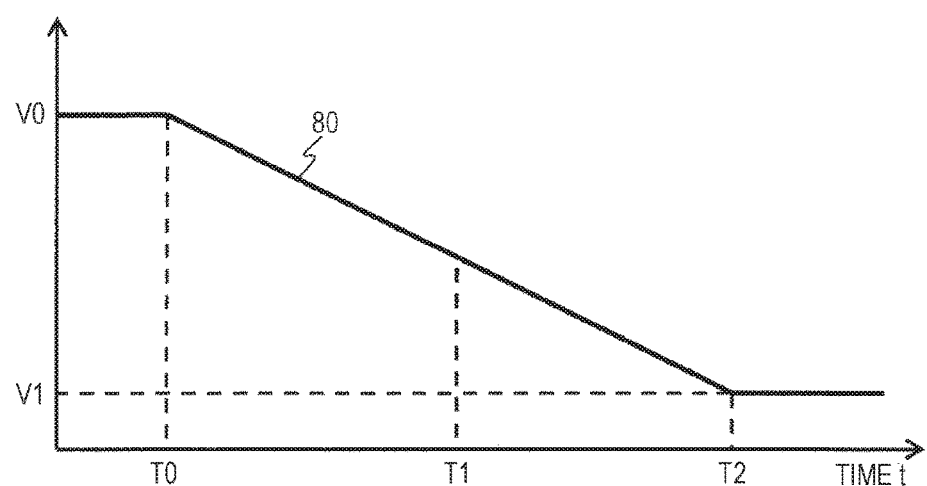
FIG. 10 is a diagram illustrating an example of a speed plan (second embodiment)

FIG. 10 illustrates a time transition of the speed plan 80 of the own vehicle 41 when the time passage illustrated in FIG. 9 is generated. At the current time T0, the moving object 42 and the speed change induction obstacle 43 are detected, ΔTTCP at the collision prediction point 47 is predicted as a value equal to or less than the predetermined value, and the speed plan 80 is generated such that the own vehicle decelerate. At this time, the own vehicle 41 starts deceleration at the current time T0 before the moving object 42 actually induces the speed vector change at the time T1.

At the time T2 when the distance of the moving object 42 and the scheduled travelling path 44 becomes the predetermined value or less, the speed of the own vehicle 41 becomes equal to the speed V1 of the moving object 42 and the own vehicle takes the driving behavior where the own vehicle follows the moving object 42 with a constant distance. As a result, as compared with the case where the own vehicle first decelerates after the speed vector change of the moving object 42 is detected at the time T1, deceleration is enabled by weak braking force and a riding comfort or a sense of security for an occupant can be raised.

Figure 11A:
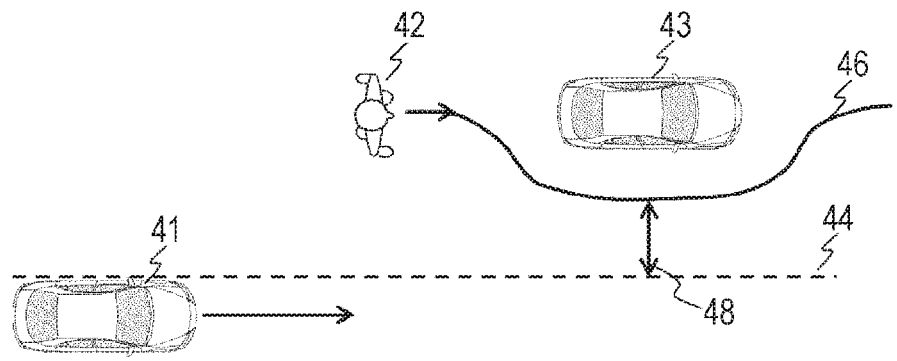
FIGS. 11A to 11C are diagrams illustrating an example of a position relation of objects and a speed plan (second embodiment)
Figure 11B:
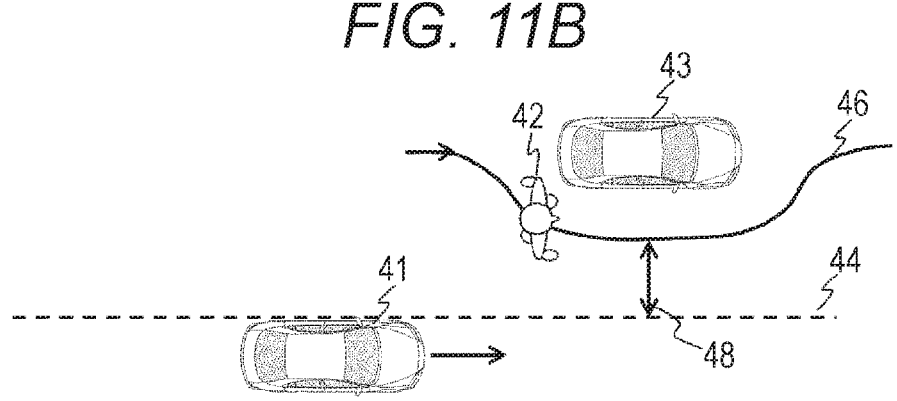
Figure 11C:
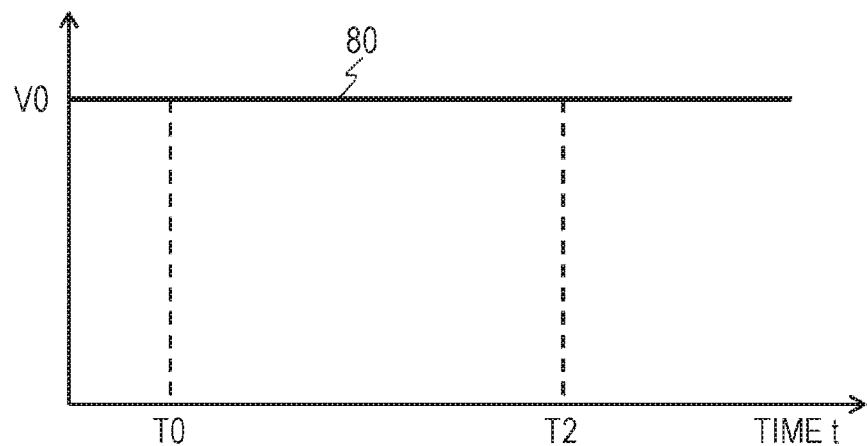

FIGS. 11A to 11C illustrate time transitions of the speed plan 80 of the own vehicle 41 when the distance of the own vehicle 41 and the moving object 42 and the speed change induction obstacle 43 is large as compared with FIGS. 9A to 9C. FIG. 11A illustrates a current time (time T0) and FIG. 11B illustrates an example of a time passage of a position relation of the own vehicle 41, the moving object 42, and the speed change induction obstacle 43 at a time (time T2) when the moving object 42 arrives at the same position as FIG. 9C. FIG. 11C illustrates a time transition of the speed plan 80 of the own vehicle 41 at that time.

In this case, because the distance of the own vehicle 41 and the moving object 42 and the speed change induction obstacle 43 is large, a place where the distance of the scheduled travelling path 44 and the prediction movement path 46 becomes the predetermined value or less, that is, the collision prediction point 47 does not exist. Therefore, as illustrated in FIG. 11C, the speed plan 80 becomes a speed plan where deceleration is not performed and the current speed V0 is maintained. As a result, when the possibility that the own vehicle 41 and the moving object 42 contact each other in the future is low, unnecessary deceleration can be prevented and convenience for the occupant such as the quick transportability to the destination can be secured.

Figure 12A:
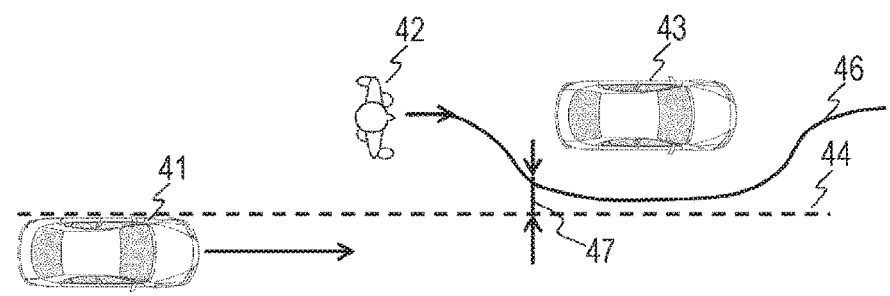
FIGS. 12A to 12C are diagrams illustrating an example of the case where a prediction is wrong (second embodiment)
Figure 12B:
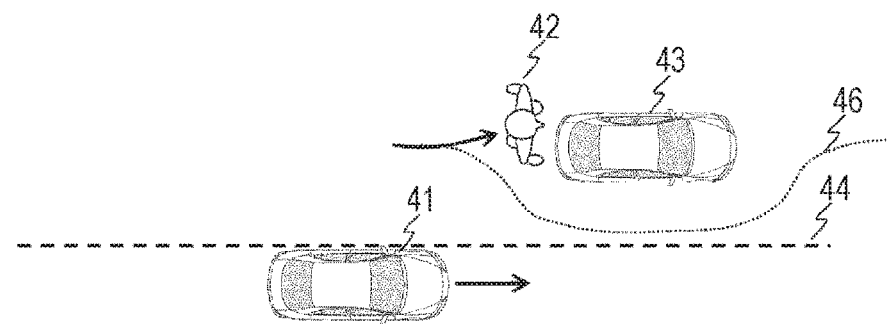
Figure 12C:
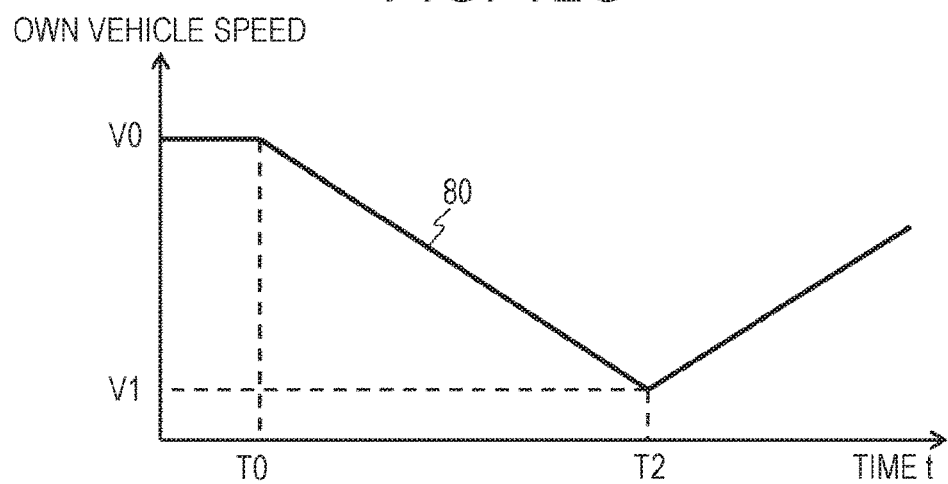

The above is the functions of the second embodiment. The second embodiment can be applied to the case where the moving object 42 or the speed change induction obstacle 43 shows a behavior different from a prediction. FIGS. 12A to 12C illustrate the case where the moving object 42 does not induce the speed vector change against the prediction movement path 46 or induces the speed vector change to be separated from the own vehicle 41.

As illustrated in FIG. 12A, if the own vehicle 41, the moving object 42, and the speed change induction obstacle 43 exist, in the present invention, the future position of the moving object 42 is predicted in consideration of the prediction movement path 46 and the speed plan of the own vehicle is made such that ΔTTCP becomes the predetermined value at the collision prediction point 47. However, as illustrated in FIG. 12B, when the moving object 42 deviates from the prediction movement path 46 at the time T2, a speed plan 80 illustrated in FIG. 12C is made such that the own vehicle decelerates up to the time T2, in consideration of a time transition of the speed plan 80, it is determined that the possibility that the own vehicle 41 and the moving object 42 contact each other is eliminated from the time T2, and the speed plan 80 is set to perform acceleration to return the speed to the initial value V0.

Figure 13A:
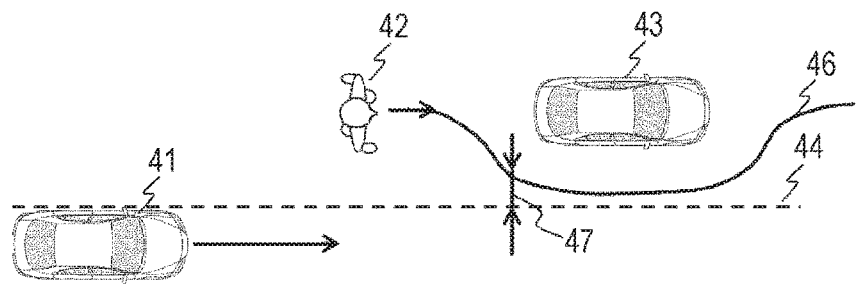
FIGS. 13A to 13C are diagrams illustrating an example of the case where a prediction is wrong (second embodiment)
Figure 13B:
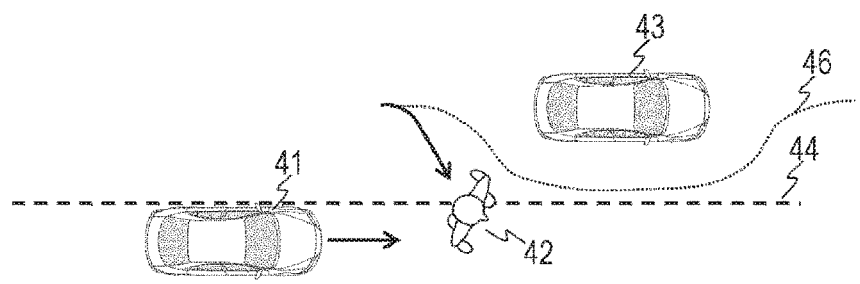
Figure 13C:
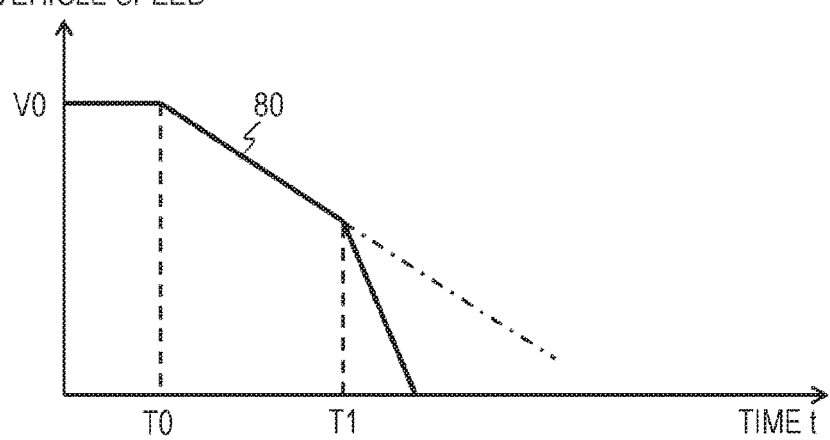

FIGS. 13A to 13C illustrate the case where the moving object 42 induces the speed vector change at a time earlier than a time according to the prediction movement path 46 and a distance with the own vehicle 41 decreases. As illustrated in FIG. 13A, if the own vehicle 41, the moving object 42, and the speed change induction obstacle 43 exist at the time T0, in the present invention, the future position of the moving object 42 is predicted in consideration of the prediction movement path 46 and the speed plan of the own vehicle is made such that ΔTTCP becomes the predetermined value at the collision prediction point 47. However, as illustrated in FIG. 13B, when the moving object 42 deviates from the prediction movement path 46 at the time T1, the own vehicle 41 is stopped by rapid braking to prevent the own vehicle 41 from contacting the moving object 42, in consideration of a time transition of the speed plan 80 illustrated in FIG. 13C.

Figure 14A:
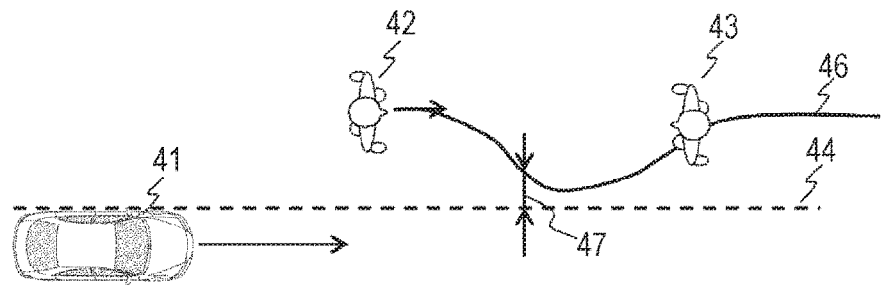
FIGS. 14A to 14C are diagrams illustrating an example of the case where a prediction is wrong (second embodiment)
Figure 14B:
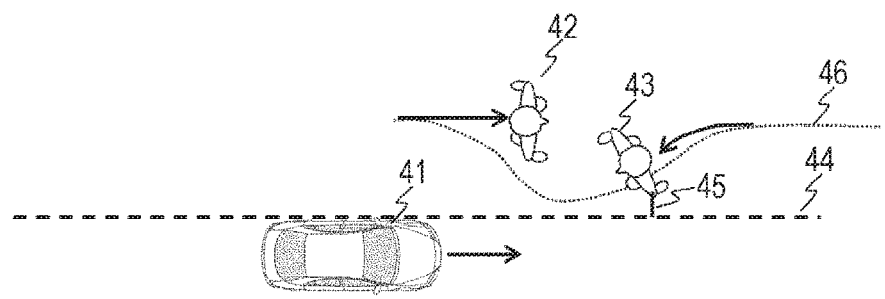
Figure 14C:
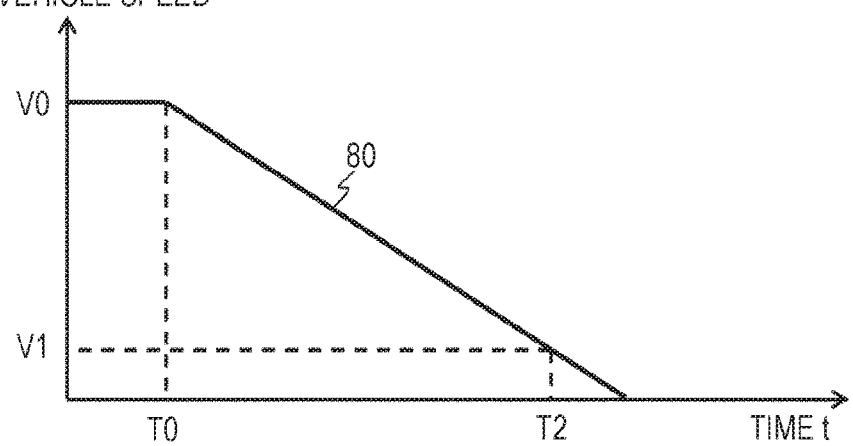

FIGS. 14A to 14C illustrate the case where a speed vector of the moving object 42 does not change against a prediction and the speed change induction obstacle 43 induces the speed vector change to the side of the own vehicle. As illustrated in FIG. 14A, if the own vehicle 41, the moving object 42, and the speed change induction obstacle 43 exist at the time T0, in the present invention, the future position of the moving object 42 is predicted in consideration of the prediction movement path 46 and the speed plan of the own vehicle is made such that ΔTTCP becomes the predetermined value at the collision prediction point 47.

However, as illustrated in FIG. 14B, at the time T2, when the moving object 42 exists at a position separated from the own vehicle 41 as compared with the prediction movement path 46 and the speed change induction obstacle 43 induces the behavior change to come close to the own vehicle 41, the speed of the own vehicle 41 is decreased because a minimum distance of the speed change induction obstacle 43 and the scheduled travelling path 44 decreases. That is, after the time T2, the speed of the own vehicle 41 decreases continuously in consideration of a time transition of the speed plan 80 illustrated in FIG. 14C. FIG. 14C illustrates the case where the speed change induction obstacle 43 moves to a position overlapping the scheduled travelling path 44 and the own vehicle 41 stops to prevent the own vehicle 41 from contacting the speed change induction obstacle 43.

Figure 15A:
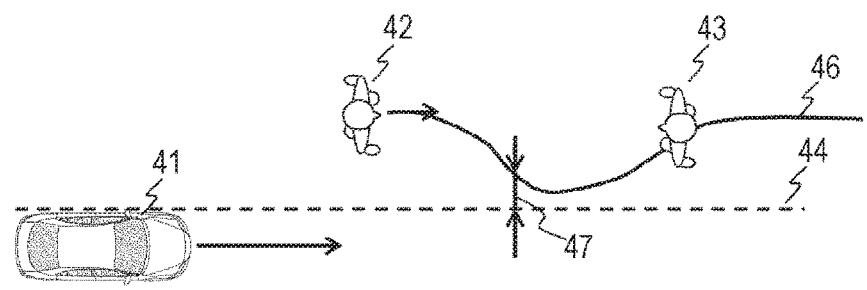
FIGS. 15A to 15C are diagrams illustrating an example of the case where a prediction is wrong (second embodiment)
Figure 15B:
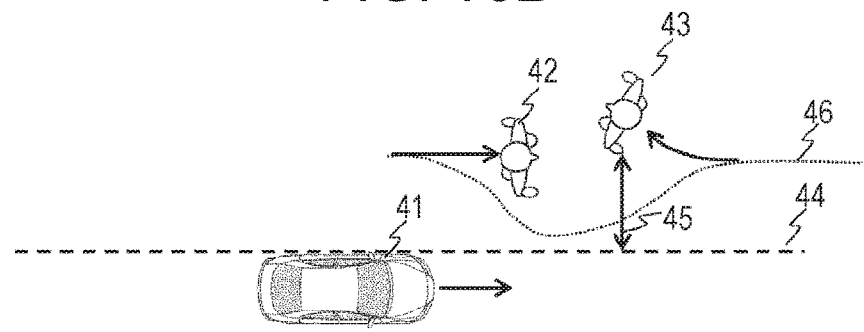
Figure 15C:
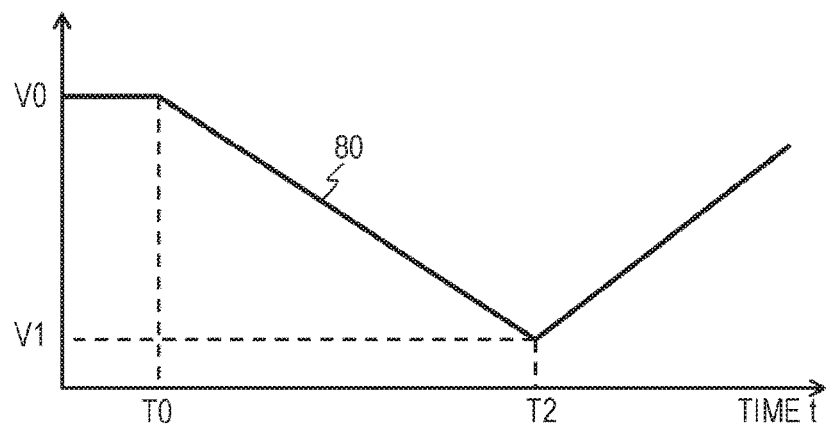

FIGS. 15A to 15C illustrate the case where a speed vector of the moving object 42 does not change against a prediction and the speed change induction obstacle 43 induces the speed vector change to be separated from the own vehicle 41. As illustrated in FIG. 15A, if the own vehicle 41, the moving object 42, and the speed change induction obstacle 43 exist at the time T0, in the present invention, the future position of the moving object 42 is predicted in consideration of the prediction movement path 46 and the speed plan of the own vehicle is made such that ΔTTCP becomes the predetermined value at the collision prediction point 47.

However, as illustrated in FIG. 15B, at the time T2, when the moving object 42 exists at a position separated from the own vehicle 41 as compared with the prediction movement path 46 and the speed change induction obstacle 43 induces the behavior change to be separated from the own vehicle 41, the own vehicle 41 increases the speed because a minimum distance of the speed change induction obstacle 43 and the scheduled travelling path 44 increases. That is, after the time T2, the speed decrease of the own vehicle 41 stops in consideration of a time transition of the speed plan 80 illustrated in FIG. 15C and the own vehicle 41 accelerates.

Figure 16:
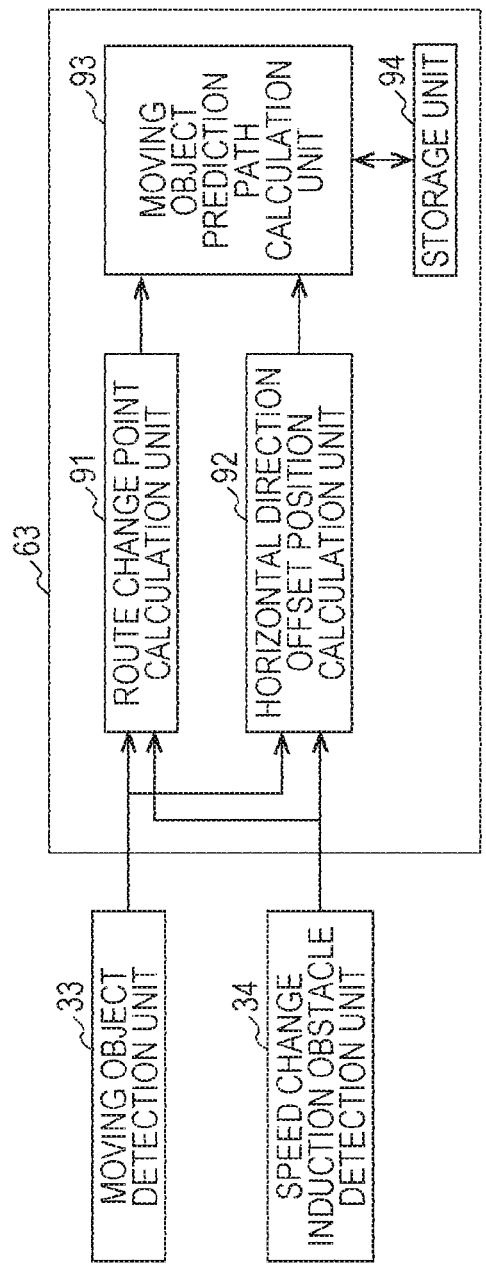
FIG. 16 is a block diagram illustrating an example of a configuration of a moving object path prediction unit 63 (second embodiment)

An example of a path prediction method in the moving object path prediction unit 63 will be described using FIGS. 16 to 18C. FIG. 16 is a block diagram illustrating an example of a configuration of the moving object path prediction unit 63. In this embodiment, the moving object path prediction unit 63 includes a route change point calculation unit 91, a horizontal direction offset point calculation unit 92, a moving object prediction path calculation unit 93, and a storage unit 94.

The route change point calculation unit 91 calculates a point where the moving object 42 induces the speed vector change in front of the speed change induction obstacle 43 and starts to move to come close to the own vehicle 41 as a route change point 82.

The horizontal direction offset point calculation unit 92 calculates a point where the moving object 42 induces the speed vector change again to pass by the speed change induction obstacle 43 after inducing the speed vector change and starts travelling to travel in front of the route change point 82 as a horizontal direction offset point 83.

Figure 17:
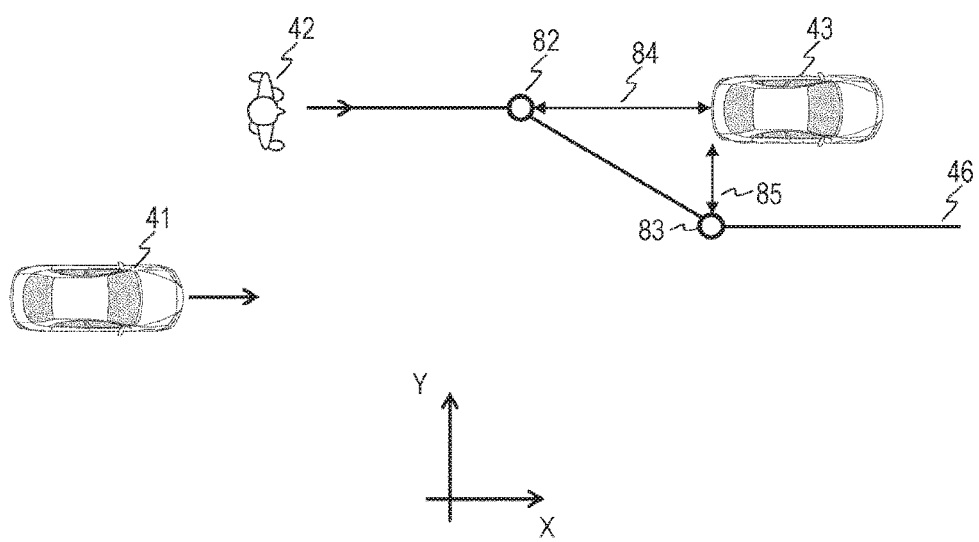
FIG. 17 is a diagram illustrating an example of a method of generating the prediction movement path 46 (second embodiment)

FIG. 17 illustrates a position relation of the route change point 82 and the horizontal direction offset point 83. As illustrated in FIG. 17, a travelling of the own vehicle 41 is set as an X axis and a direction to be orthogonal to the travelling direction to be a leftward direction of the travelling direction is set as a Y axis. The moving object 42 moves obliquely to come close to the own vehicle 41, from the route change point 82 positioned in front of the speed change induction obstacle 43. At this time, a distance of the route change point 82 and the speed change induction obstacle 43 in the X direction is defined as a route change distance 84.

After the moving object 42 passes through the route change point 82, if the moving object 42 arrives at the horizontal direction offset point 83 where the moving object 42 can pass by the speed change induction obstacle 43, the moving object starts travelling again to travel in front of the route change point 82. At this time, a distance of the horizontal direction offset point 83 and the speed change induction obstacle 43 in the Y direction is defined as a horizontal direction offset distance 85. FIG. 17 illustrates an example of the case where the X coordinates of the horizontal direction offset point 83 is set equally to the X coordinates of a side closest to the own vehicle 41 among four sides of the speed change induction obstacle 43. In addition, there is an individual difference in an actual movement of the moving object 42 and the X coordinates of the horizontal direction offset point 83 may be changed in consideration of the individual difference.

The moving object prediction path calculation unit 93 generates the prediction movement path 46 of the moving object 42, on the basis of the route change point 82 and the horizontal direction offset point 83. FIG. 17 illustrates an example of the case where the prediction movement path 46 is generated to couple the route change point 82 and the horizontal direction offset point 83 from the current position of the moving object 42 by a polygonal line. However, a coupling line is not limited thereto the polygonal line and may be a smooth curved line passing through the route change point 82 and the horizontal direction offset point 83.

The storage unit 94 stores information necessary in the moving object prediction path calculation unit 93. For example, attributes such as a pedestrian, a two-wheeled vehicle, an age, a sex, and an area are acquired on the basis of sensor values when the moving object 42 is detected and an average value of the prediction movement path 46 or an average position of the route change point 82 and the horizontal direction offset point 83 based on the attributes is acquired by communication and is stored in the storage unit 94. If a movement locus until the current time after the moving object 42 is detected is stored, the prediction movement path and the movement locus are compared, and the route change point 82 and the horizontal direction offset point 83 is determined, the prediction movement path 46 close to an actual movement path of the moving object 42 is obtained.

When the distance of the own vehicle 41 and the moving object 42 increase, it is easy for an error to occur in the current position of the moving object 42 and it is difficult to acquire the attributes from sensor information. For this reason, it is difficult to accurately predict the route change point 82 and the horizontal direction offset point 83. Therefore, it is preferable to predict the safety when the distance increases and identify the route change point 82 and the horizontal direction offset point 83 in real time when the distance decreases and accuracy of the prediction movement path 46 of the moving object 42 becomes high.

Figure 18A:
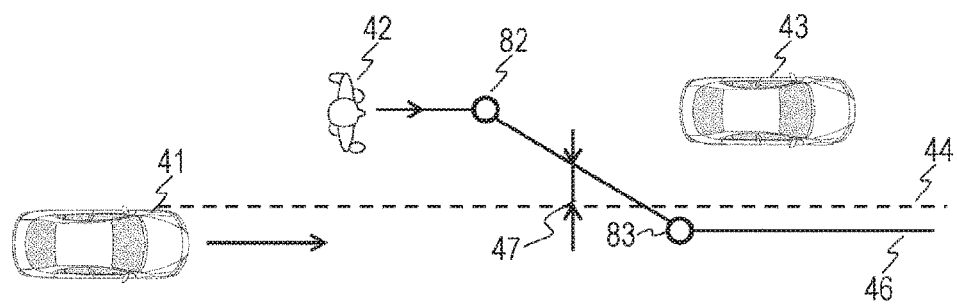
FIGS. 18A to 18C are diagrams illustrating an example of a speed plan method of an own vehicle based on the method of generating the prediction movement path 46 (second embodiment)
Figure 18B:
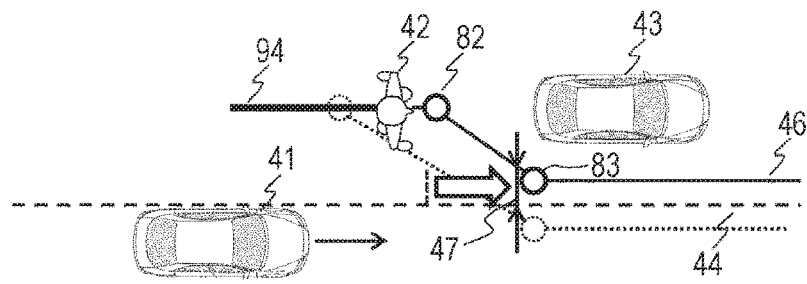
Figure 18C:
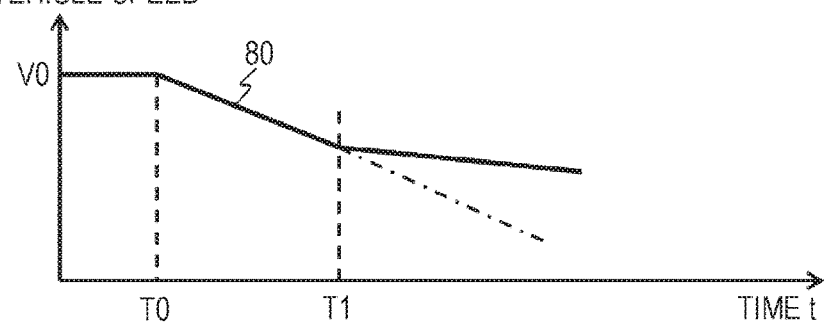

An example of an identification method of the route change point 82 and the horizontal direction offset point 83 is illustrated in FIGS. 18A to 18C. FIG. 18A illustrates a position relation of the own vehicle 41, the moving object 42, and the speed change induction obstacle 43 at the current time T0. At this time, when the distance of the own vehicle 41 and the moving object 42 is large and the attributes of the moving object 12 cannot be sufficiently acquired, the moving object prediction path calculation unit 93 sets each of a route change distance 84 and a horizontal direction offset distance 85 to a farthest position from the speed change induction obstacle 43, on the basis of past movement path data stored in the storage unit 94. The positions of the prediction movement path 46 and the collision prediction point 47 are identified on the basis of the set route change distance 84 and horizontal direction offset distance 85 and the speed plan 80 of the own vehicle 41 is generated.

However, the prediction movement path is a path passing through the farthest position from the speed change induction obstacle 43 and the possibility that the moving object passes through the vicinity of the speed change induction obstacle 43 rather than the prediction movement path is high. Therefore, as illustrated in FIG. 18B, at the time T1, if the moving object 42 approaches the speed change induction obstacle 43 across the route change point 82 set once, at least one of the route change distance 84 and the horizontal direction offset distance 85 is decreased by comparison with the past movement path data stored in the storage unit 94. As a result, because the collision prediction point 47 moves to be separated from the own vehicle 41, as illustrated in FIG. 18C, after the time T1, deceleration of the speed plan 80 is mitigated and a decrease in the speed is mitigated.

In the embodiment described above, the real-time identification method is described on the premise of the predic-tion movement path generation method based on the route change point 82 and the horizontal direction offset point 83. The real-time identification method is not limited to the embodiment. For example, in a method of generating a most similar path as the prediction movement path 46 by comparison with the past movement path data stored in the storage unit 94, the movement locus until the current time after the moving object 42 may be detected is stored in the storage unit 94 and when the accumulated data is small, a path passing through a farther place from the speed change induction obstacle 43 may be selected and candidates of the prediction movement path 46 may be gradually limited in a step in which the accumulation data is sufficiently stored.

The example of the path prediction method in the moving object path prediction unit 63 has been described. However, the moving object path prediction unit 63 is not limited to the above configuration and any mechanism for generating a predicted future position or track of the moving object 42 can be applied.

In the second embodiment described above, the speed plan method is described on the premise of deceleration of a constant speed from the current time to the target arrival time. However, if a sense of security and quack transportability of an occupant are considered, it is necessary to suppress jerk to be a temporal change of acceleration. Therefore, an example of a speed plan mechanism having considered the temporal change of the jerk will be described using FIGS. 19A to 20C.

Figure 19A:
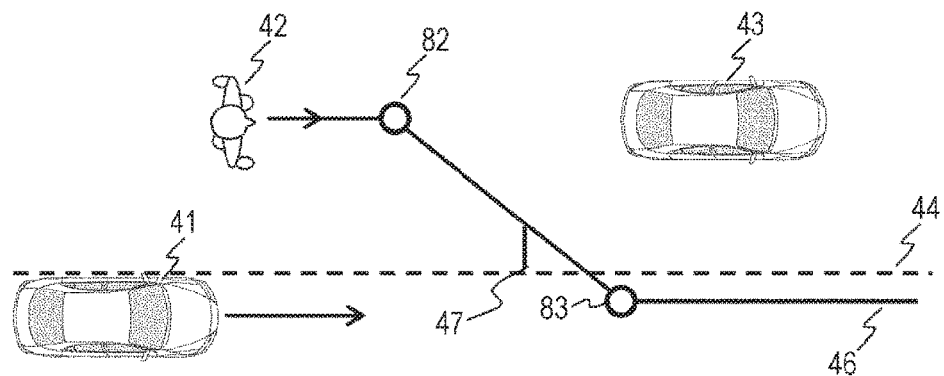
FIGS. 19A and 19B are diagrams illustrating a position relation of objects in an example of the speed plan method (second embodiment)
Figure 19B:
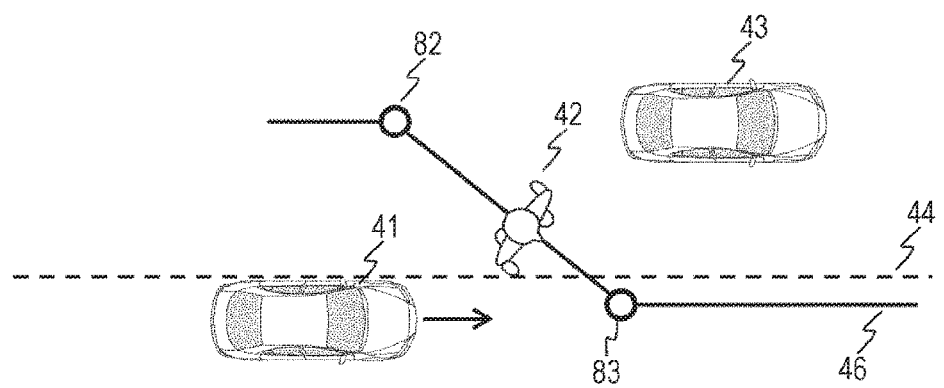

It is assumed that a position relation of the own vehicle 41, the moving object 42, and the speed change induction obstacle 43 is as illustrated in FIGS. 19A and 19B. That is, the case where the position relation illustrated in FIG. 19A is realized at the time T0 and the moving object 42 induces a speed vector change like the prediction movement path 46 at the time T1 and arrives at a position overlapping the scheduled travelling path 44 of the own vehicle 41 is assumed. At this time, a speed plan where the own vehicle 41 travels at a speed V0 at the current time T0 and travels at the same speed V1 as the speed of the moving object 42 at the time T1 as illustrated in FIG. 19B is made.

Figure 20A:
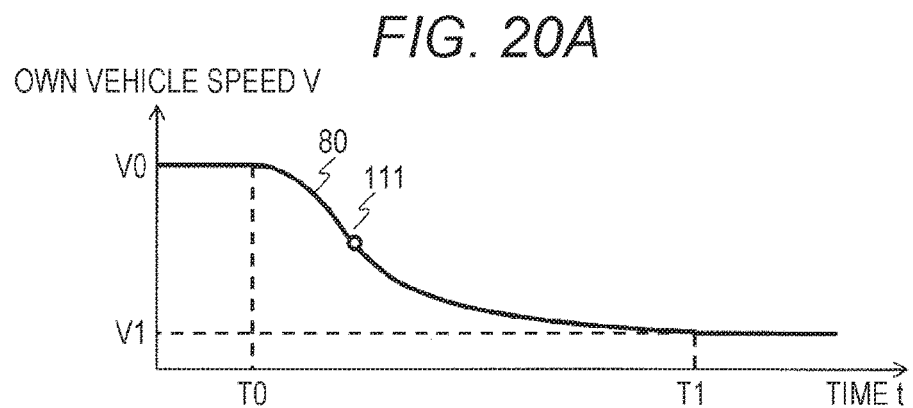
FIGS. 20A to 20C are diagrams illustrating an example of the speed plan method (second embodiment)
Figure 20B:
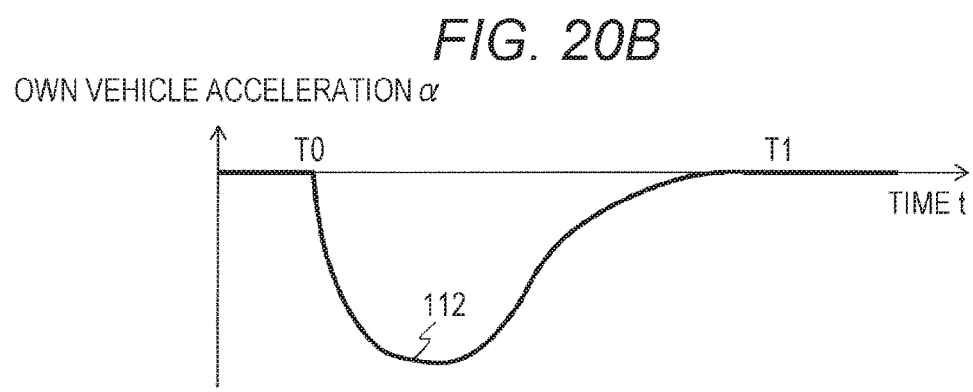
Figure 20C:
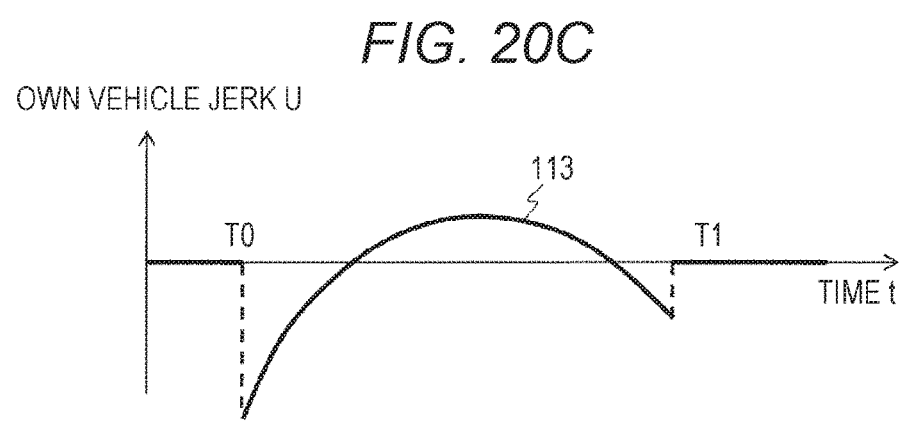

FIGS. 20A to 20C illustrate an example of a speed plan method. In this embodiment, a speed plan from the current time T0 to the target arrival time T1 is defined as an N-dimensional time-series vector V. When acceleration to be time differentiation for each element of the vector V is defined as an N-dimensional vector α and jerk to be time differentiation for each element of α is defined an N-dimensional vector U, in this embodiment, U is planned on the basis of a formula 2.

$$U = \Sigma T \cdot (\Sigma \cdot \Sigma T)^{-1} \cdot (X[N] - A^N \cdot X[N])$$ [Formula 2]

Here, Σ shows a matrix defined by a formula 3, A shows a matrix defined by a formula 4, X shows a three-dimensional vector defined by a formula 5, and T shows a transposition of a matrix.

$$\Sigma = [A^{(N-1)} \cdot B, A^{(N-2)} \cdot B, \ldots, B]$$ [Formula 3]

$$A = [1\ Ts\ 0;\ 0\ 1\ Ts;\ 0\ 0\ 1]$$ [Formula 4]

$$X[k] = [x[k];\ V[k];\ \alpha[k]]$$ [Formula 5]

Here, x shows an N-dimensional vector showing a target position of the own vehicle 41, B shows a three-dimensional vector defined by a formula 6, Ts shows a time interval (for example, 0.1 sec.) of time-series data of the speed plan 80, and (;) shows a line feed in the matrix.

$$B = [0;\ 0;\ Ts]$$ [Formula 6]

Results obtained by determining the N-dimensional vector U on the basis of the formula 2, acquiring a by time integration, and acquiring V by time integration are illustrated in FIGS. 20A to 20C. Characteristics of temporal changes thereof are described. First, in the speed plan V, as illustrated in FIG. 20A, an inflection point 111 exists between the current time T0 and the target arrival time T1, V changes in an upward convex shape before the injection point, and V changes in a downward convex shape after the inflection point. As a result, the acceleration a changes continuously or smoothly at all times, as illustrated in FIG. 20B. In addition, the jerk U changes as a quadratic function for a time, as illustrated in FIG. 20C.

In this embodiment, the acceleration change when the own vehicle 41 decelerates on the basis of the prediction movement path 46 of the moving object 42 becomes smooth and riding comfort or a sense of security for the occupant can be raised.

Third Embodiment

Next, a third embodiment to be an example of the present invention will be described using FIGS. 21 to 24C. Descriptions for the parts similar to the first or second embodiment described above are omitted.

In the first and second embodiments, a speed change is performed only when both a moving object 42 and a speed change induction obstacle 43 exist and the speed change is not performed when only the moving object 42 exists. As a result, even when an own vehicle 41 passes through the immediate vicinity of the moving object 42, the own vehicle 41 does not decelerate and it may lead to a sense of discomfort or a sense of uneasiness for an occupant.

In addition, a prediction movement path 46 is only a prediction. Even in the case where the moving object 42 induces a speed vector change against the prediction, it is preferable to use a speed plan to prevent a contact with the own vehicle 41 together. Therefore, in the present invention, even in the case where only the moving object 42 exists, when the own vehicle passes through the vicinity of the moving object 42, a speed plan to decelerate the own vehicle may be used together.

Figure 21:
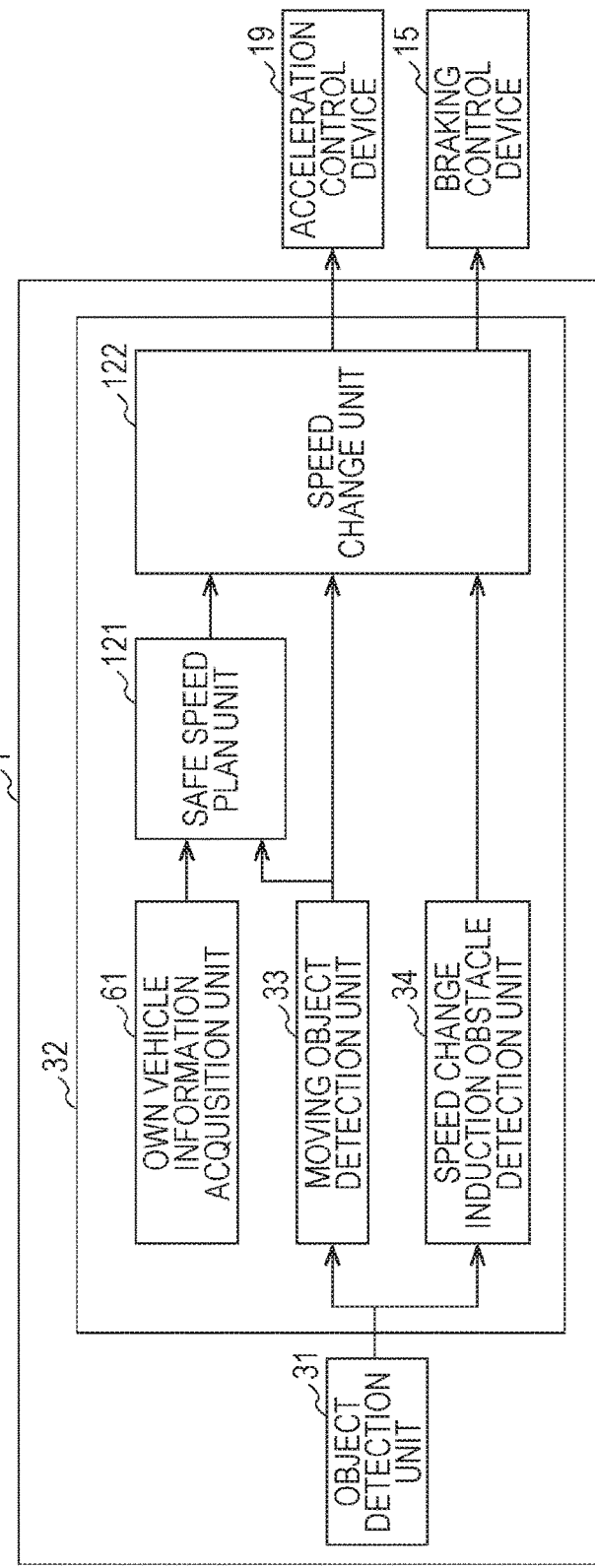
FIG. 21 is a block diagram illustrating a configuration of a third embodiment of the vehicle drive control apparatus 1.

FIG. 21 is a block diagram illustrating a part of a configuration of the third embodiment of the present invention. In the third embodiment illustrated in FIG. 21, a vehicle drive control apparatus 1 includes an object detection unit 31 and a speed control unit 32, similar to the first and second embodiments. The speed control unit 32 includes a moving object detection unit 33, a speed change induction obstacle detection unit 34, and an own vehicle information acquisition unit 61, similar to the first and second embodiments. The speed control unit 32 further includes a safe speed plan unit 121 and a speed change unit 122.

The safe speed plan unit 121 calculates a safe speed 131, on the basis of a current position of the own vehicle 41 acquired by the own vehicle information acquisition unit 61 and a current position of the moving object 42 detected by the moving object detection unit 33. The safe speed is set low when a distance of the own vehicle and the moving object is small and a speed of the own vehicle is controlled to be lower than the safe speed at all times. The safe speed is set as an upper limit speed at which, when the moving object performs a route change unexpectedly, the own vehicle performs rapid braking and can stop before the own vehicle and the moving object contact each other.

A method of calculating the safe speed 131 will be described using FIG. 22. The safe speed is determined according to a relative distance of the own vehicle 41 and the moving object 42. Specifically, the safe speed is calculated from a travelling direction distance 125 to be a relative distance along a travelling direction of the own vehicle and a horizontal direction distance 126 to be a relative distance of a direction orthogonal to the travelling direction of the own vehicle. The safe speed is set low when the travelling direction distance decreases in the same horizontal direction distance. This means that the speed decreases when the own vehicle 41 comes close to the moving object 42 while travelling in the same direction as a movement direction of the moving object 42.

Meanwhile, the safe speed is set low when the horizontal direction distance decreases in the same travelling direction distance. This means that the speed decreases when the own vehicle passes through a point close to the moving object while the own vehicle passes through the vicinity of the moving object. If the above characteristics are integrated, the safe speed becomes a distribution illustrated in an example of a two-dimensional map of FIG. 22.

Figure 22:
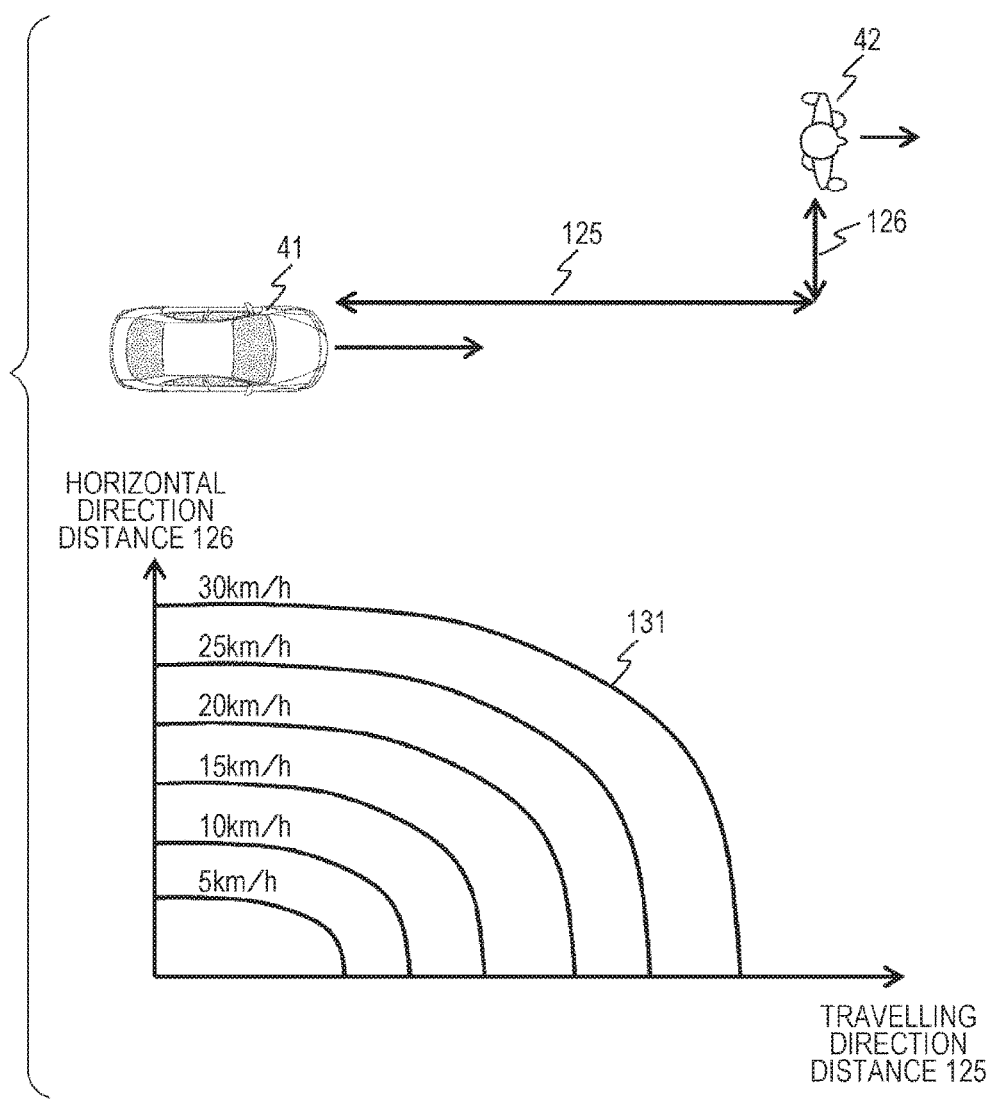
FIG. 22 is a diagram illustrating an example of a safe speed (third embodiment)

As a calculation method of the safe speed 131 when the own vehicle detects the moving object during travelling, a method of previously storing a relation illustrated in the two-dimensional map of FIG. 22 as a lookup table and determining the safe speed from the travelling direction distance 125 and the horizontal direction distance 126 at that instant is exemplified. In addition, it may be assumed that the moving object 42 induces a route change at a current time, safe speeds may be calculated for all travelling angles, and a minimum value of the safe speeds may be selected.

For example, in the case where a distance of the own vehicle 41 and the moving object 42 is X[m] when the horizontal direction distance is sufficiently small and setting deceleration of the own vehicle 41 when the moving object 42 performs a route change is α[m/s^2], a safe speed Vs [m/s] is approximately acquired as represented by a formula 7.

$$Vs = \sqrt{(2 \cdot \alpha \cdot X)} \quad \text{[Formula 7]}$$

As represented by the formula 7, the safe speed increases when the setting deceleration α increases and decreases when the setting deceleration α decreases. Therefore, because a spread of a distribution of the two-dimensional map of FIG. 22 is different according to the setting deceleration α of the own vehicle 41, a lookup table of the safe speed may be switched according to a road surface state of the moment.

The speed change unit 122 determines a lower side of a speed plan 80 generated on the basis of a relative position relation of the own vehicle 41, the moving object 42, and the speed change induction obstacle 43 and the safe speed 131 generated by the safe speed plan unit 121 as a target speed of the own vehicle 41. In addition, the speed change unit 122 generates an acceleration/deceleration command value on the basis of an own vehicle position and an operation state amount, such that the vehicle behavior follows the target speed, and transmits the command value to an acceleration control device 19 and a braking control device 15 by communication.

Figure 23A:
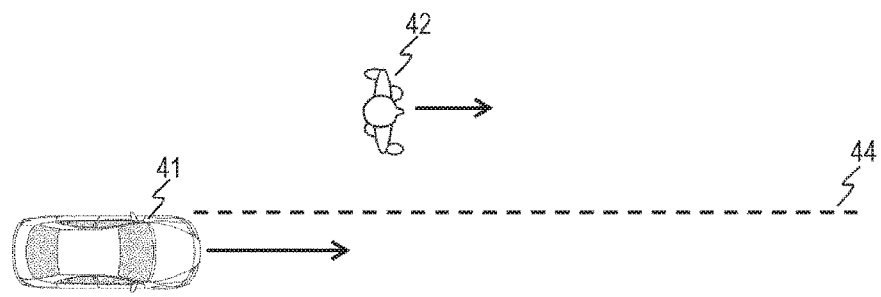
FIGS. 23A and 23B are diagrams illustrating a vehicle behavior (third embodiment)
Figure 23B:
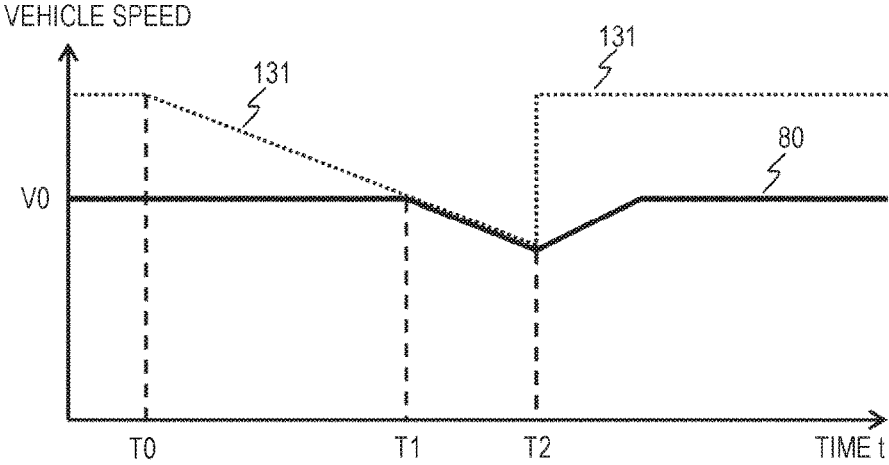

Functions of the third embodiment of the present invention will be described using FIGS. 23A to 24C. FIGS. 23A and 23B illustrate a time transition of the safe speed 131 and the speed plan 80 of the own vehicle when only the moving object 42 exists. As illustrated in FIG. 23A, the own vehicle 41 and the moving object 42 exist at a time T0. Here, an example of the case where the safe speed is set to an upper limit Vmax when a distance of the own vehicle and the moving object is sufficiently large is illustrated. At this time, because the speed change induction obstacle 43 does not exist, deceleration based on a speed vector change prediction of the moving object 42 is not performed.

However, the safe speed 131 is calculated at all times according to the time transition of the speed plan 80 illustrated in FIG. 23B and is set low when the own vehicle 41 comes close to the moving object 42. For this reason, the final speed plan 80 changes such that the own vehicle decelerates from a time T1 when the own vehicle comes close to the moving object to a time T2 when the own vehicle passes by the moving object. If the own vehicle passes by the moving object, the safe speed becomes VMax again. For this reason, the speed plan is made such that the own vehicle accelerates again. In FIGS. 23A and 23B, deceleration based on the safe speed is performed. However, when the horizontal direction distance 126 is sufficiently large, the safe speed may be higher than a current speed of the own vehicle 41 at all times and deceleration may not be performed.

Figure 24A:
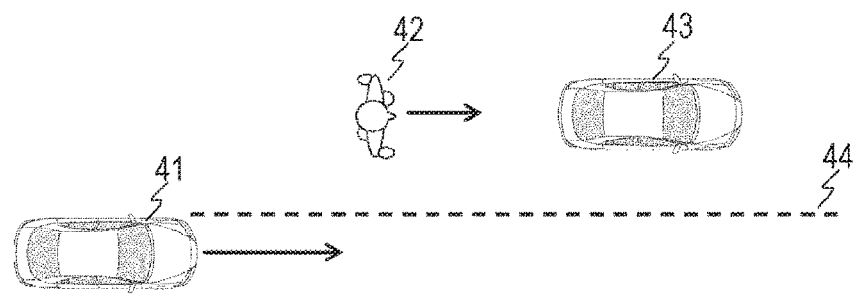
FIGS. 24A to 24C are diagrams illustrating a vehicle behavior (third embodiment).
Figure 24B:
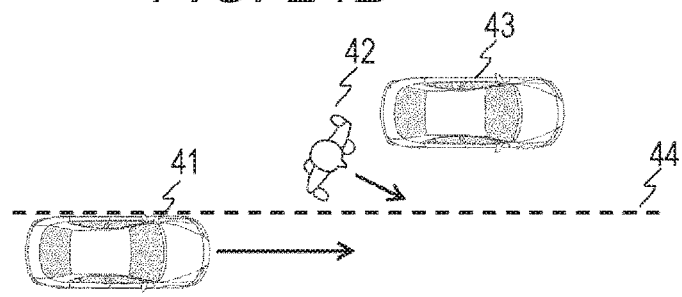
Figure 24C:
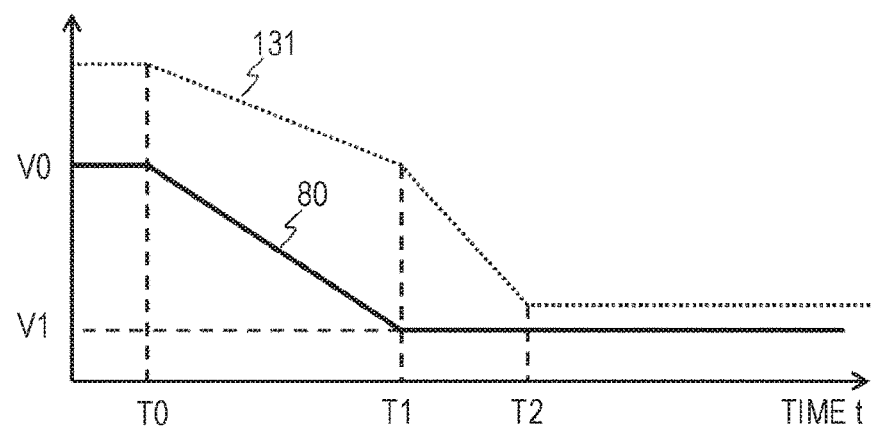

FIGS. 24A to 24C illustrate a time transition of the safe speed 131 and the speed plan 80 of the own vehicle when both the moving object 42 and the speed change induction obstacle 43 exist and a speed change based on a speed vector change prediction of the moving object 42 is performed. When a position relation of the own vehicle 41, the moving object 42, and the speed change induction obstacle 43 at the current time T0 is as illustrated in FIG. 24A, the speed plan 80 based on the speed vector change prediction shows deceleration.

As illustrated in FIG. 24B, the own vehicle 41 decelerates sufficiently until the time T1 when the moving object 42 overlaps a scheduled travelling path 44 of the own vehicle. At this time, as illustrated in FIG. 24C, the safe speed 131 is also calculated simultaneously on the basis of a relative position relation of the own vehicle and the moving object and the safe speed also decreases when the own vehicle comes close to the moving object. In an example of FIG. 24C, the speed plan based on the speed vector change prediction of the moving object 42 is lower than the safe speed at all times. However, when the speed plan based on the speed vector change prediction is higher than the safe speed, the safe speed is selected as a final speed plan value.

According to the third embodiment described above, even when only the moving object 42 exists, appropriate deceleration is performed when the own vehicle passes through the vicinity of the moving object and a sense of uneasiness for an occupant can be reduced.

In the first to third embodiments described above, content of a prediction movement path 46 of the moving object 42 and the speed plan 80 of the own vehicle 41 based on the prediction movement path 46 is preferably provided to the occupant by a display device 24. As specific examples of information to be displayed, there are display of objects existing around the own vehicle 41, display of the prediction movement path 46 of the moving object 42, whether the paths of the own vehicle 41 and the moving object 42 cross each other, ΔTTCP, a current travelling plan of the own vehicle 41, and a driving behavior taken from the current travelling plan. In the case of automatic travelling in which there is no operation from the occupant, a difference between assumed travelling of the occupant and actual travelling of the vehicle leads to the sense of uneasiness of the occupant. A sense of security of the occupant can be raised by reducing the difference by the display device 24.

In the first to third embodiments described above, the case where the automatic travelling is performed by the vehicle drive control apparatus 1 is described. However, the present invention can be applied to a driving support system mounted on a vehicle operated by a driver for driving. In this case, if the future travelling path and speed of the own vehicle are predicted from a current driving state of a driver and the own vehicle travels according to the prediction, a warning can be provided to the driver when there is a risk of colliding with a speed changed moving object. In addition, because emergency automatic braking for collision avoidance can be performed earlier as compared with the related art, a collision avoidance system with higher accuracy can be realized.

In addition, in the first to third embodiments described above, the future route change of the moving object is predicted from the current relative position relation. However, accuracy of the speed change prediction of the moving object can be improved by a mechanism for detecting the behavior intention of the moving object directly. For example, the own vehicle includes a communication unit with a portable terminal of the moving object, acquires a scheduled movement path of the moving object from the portable terminal by communication, and determines a travelling direction of the moving object with higher accuracy. As a result, it is more accurately determined whether the target travelling track of the own vehicle 41 and the prediction track of the moving object cross.

The embodiments have been described. However, a specific configuration is not limited to the individual embodiments and various design changes can be made without departing from the scope of the invention.

What is claimed is:

1. A vehicle drive control apparatus comprising:
an object detector, wherein said object detector detects positions, speeds, and sizes of objects around an own vehicle;
a speed controller, wherein said speed controller detects a moving object existing in a place adjacent to a scheduled travelling path of the own vehicle and a speed change induction obstacle inducing a future speed vector change of the moving object from the objects detected by the object detector and changes a speed of the own vehicle, on the basis of a relative position relation of the own vehicle and the detected moving object and speed change induction obstacle;
wherein the speed controller includes a moving object path predictor, wherein said moving object path predictor predicts a future route change allowing the moving object to avoid the speed change induction obstacle and calculates a prediction future position of the moving object until a predetermined time passes, and
the speed controller changes the speed such that the own vehicle decelerates from a current speed, when it is predicted that an arrival time difference of the moving object and the own vehicle at a collision prediction point to be a point closest to the own vehicle among points where a distance of the scheduled travelling path and the prediction future position becomes a predetermined value or less is a predetermined value or less, on the basis of the moving object path predictor.

2. The vehicle drive control apparatus according to claim 1, wherein
the speed controller controls the speed such that the speed of the own vehicle decreases as a minimum distance of the scheduled travelling path and the speed change induction obstacle decreases, when the moving object and the speed change induction obstacle are detected.

3. The vehicle drive control apparatus according to claim 1, wherein the speed controller detects an object, which travels in a direction where an angle with a travelling direction of the own vehicle is a predetermined value or less and has a distance with the own vehicle to be a predetermined value or less, among the objects as the moving object, and the speed controller detects an object, in which a minimum distance for a straight line extended in the travelling direction of the moving object is a predetermined value or less and which moves or stops in a direction where a relative distance with the moving object decreases, among the objects as the speed change induction obstacle.

4. The vehicle drive control apparatus according to claim 1, wherein in the case where the moving object travels to be parallel to a travelling direction of the own vehicle against the prediction future position or moves to be separated from the own vehicle, the speed controller accelerates the own vehicle as compared with the opposite case.

5. The vehicle drive control apparatus according to claim 1, wherein in the case where the moving object moves in a direction where a distance with the own vehicle decreases, against the prediction future position, the speed controller decelerates the own vehicle as compared with the opposite case.

6. The vehicle drive control apparatus according to claim 1, wherein the moving object path predictor calculates two points including a route change point to be a place where the moving object performs a route change and a horizontal direction offset point to be a place where the moving object changes a route to a direction parallel to a travelling direction of the own vehicle after the route change, and the moving object path predictor sets a track coupling the two points of the route change point and the horizontal direction offset point as the prediction future position of the moving object.

7. The vehicle drive control apparatus according to claim 6, wherein the moving object path predictor stores a plurality of patterns for the route change point and the horizontal direction offset point or acquires the plurality of patterns by communication, stores a past movement locus of the moving object, and calculates the route change point and the horizontal direction offset point by comparing the movement locus and the patterns.

8. The vehicle drive control apparatus according to claim 1, wherein when it is predicted that the arrival time difference is the predetermined value or less, the speed controller causes the collision prediction point to approach the own vehicle as the distance of the moving object and the own vehicle increases.

9. The vehicle drive control apparatus according to claim 1, wherein the speed controller determines a target arrival time of the own vehicle at the collision prediction point, such that the own vehicle passes through the collision prediction point after a time of the predetermined value passes from when the moving object passes through the collision prediction point, when it is predicted that the arrival time difference is the predetermined value or less, and the speed controller changes the speed of the own vehicle, such that the own vehicle arrives the collision prediction point at the target arrival time and the speed of the own vehicle becomes equal to the speed of the moving object.

10. The vehicle drive control apparatus according to claim 9, wherein the speed controller changes the speed of the own vehicle such that a temporal change of the speed becomes a change of an upward convex shape from the current time and then changes the speed of the own vehicle such that the temporal change of the speed becomes a change of a downward convex shape until the target arrival time.

11. The vehicle drive control apparatus according to claim 9, wherein the speed controller changes the speed of the own vehicle, such that a temporal change of acceleration of the own vehicle is continuous and jerk changes as a quadratic function for a time, from the current time to the target arrival time.

12. The vehicle drive control apparatus according to claim 1, wherein the speed controller includes a safe speed planner, wherein said safe speed planner plans a speed to decrease the speed of the own vehicle when the distance of the own vehicle and the moving object is small, on the basis of a relative position relation of the moving object and the own vehicle at the current time, and the speed controller changes the speed of the own vehicle, such that the speed is less than a speed plan value based on the safe speed planner at all times.

13. The vehicle drive control apparatus according to claim 12, wherein the safe speed planner calculates or stores an upper limit of the speed of the own vehicle, such that the own vehicle decelerates at predetermined deceleration and stops before contacting the moving object, when the moving object changes a route to any direction at any time, and plans a speed based on the upper limit of the speed.

* * * * *